US012236198B2

(12) United States Patent
Yarabolu

(10) Patent No.: US 12,236,198 B2
(45) Date of Patent: Feb. 25, 2025

(54) PRESERVING TEXT AND SPEECH SEMANTICS USING REAL-TIME VIRTUAL CORPORA IN LIVE INTERACTIVE CHATBOT SESSIONS

(71) Applicant: Bank of America Corporation, Charlotte, NC (US)

(72) Inventor: Vijay Kumar Yarabolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 270 days.

(21) Appl. No.: 17/845,279

(22) Filed: Jun. 21, 2022

(65) Prior Publication Data
US 2023/0409839 A1 Dec. 21, 2023

(51) Int. Cl.
*G06F 40/35* (2020.01)
*G06F 40/205* (2020.01)
*G10L 15/18* (2013.01)

(52) U.S. Cl.
CPC .......... *G06F 40/35* (2020.01); *G06F 40/205* (2020.01); *G10L 15/1815* (2013.01); *G10L 15/1822* (2013.01)

(58) Field of Classification Search
None
See application file for complete search history.

(56) References Cited

U.S. PATENT DOCUMENTS

| 8,595,642 B1* | 11/2013 | Lagassey ............... G10L 15/22 715/779 |
| 10,992,604 B1 | 4/2021 | Knas et al. |
| 11,030,412 B2 | 6/2021 | Shanmugam et al. |
| 2021/0377391 A1 | 12/2021 | Thiyagarajan et al. |

* cited by examiner

*Primary Examiner* — Quynh H Nguyen
(74) *Attorney, Agent, or Firm* — Banner & Witcoff, Ltd.

(57) ABSTRACT

Aspects of the disclosure relate to preserving text and speech semantics using real-time virtual corpora in live interactive chatbot sessions. A computing platform may receive user input and may determine whether characteristics of the input are identifiable. Based on determining the characteristics are identifiable, the computing platform may populate the characteristics using a global corpora and may use the populated characteristics to generate a response to the input. Alternatively, based on determining the characteristics are unidentifiable, the computing platform may determine whether the same or a similar input is stored in a virtual corpora. If the same or a similar input is stored in the virtual corpora, the computing platform may generate a response to the input using the virtual corpora. Alternatively, if the same or a similar input was not previously received, the computing platform may gather information from the user to generate a response to the input.

18 Claims, 14 Drawing Sheets

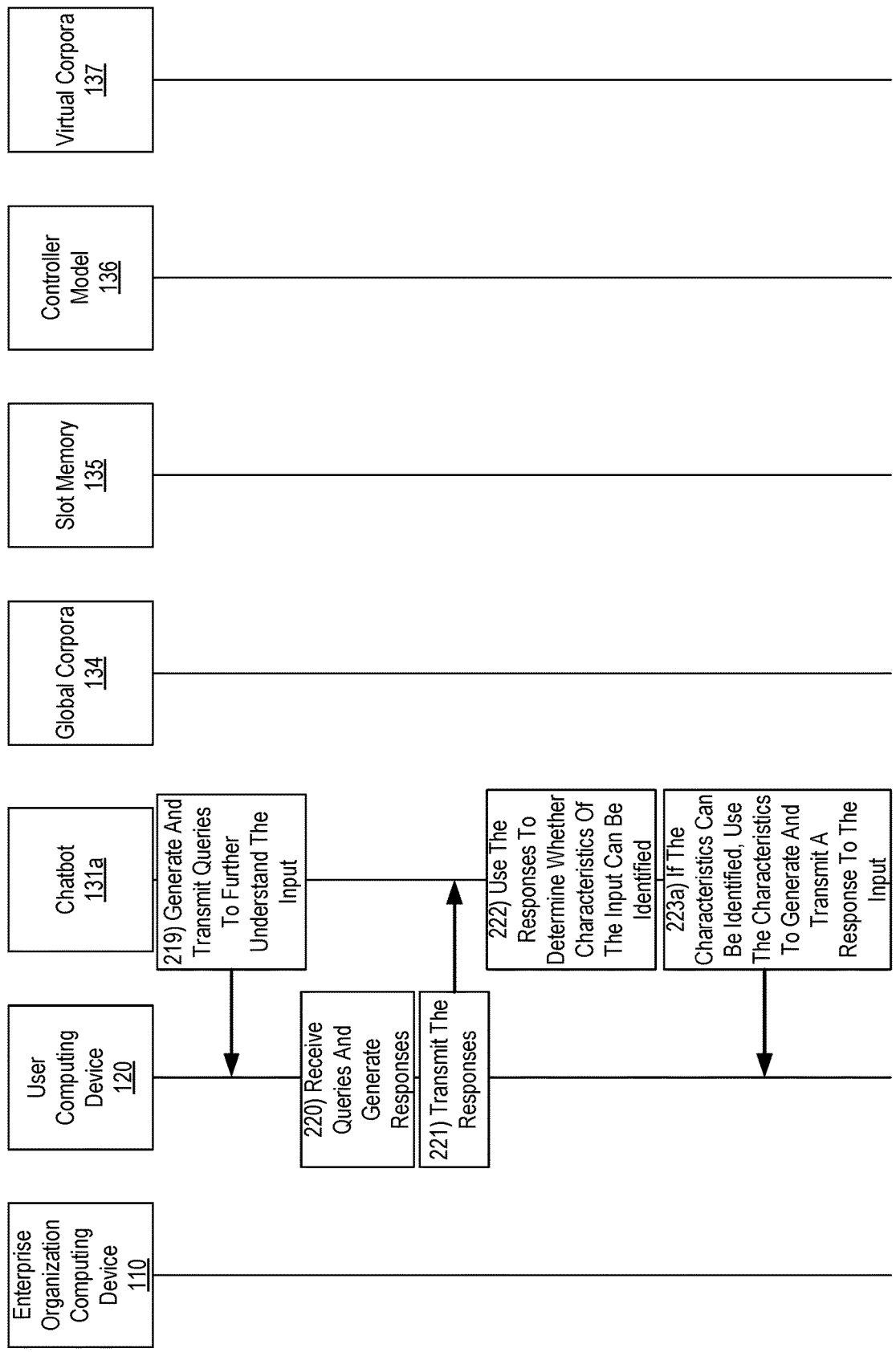

| Domain | Slot |
|---|---|
| attraction | area, name, type |
| bus | arriveby, book people, day, departure, destination, leaveat |
| hospital | department |
| hotel | area, book day, book people, book stay, internet, name, parking, pricerange, stars, type |
| restaurant | area, book day, book people, book time, food, name, pricerange |
| taxi | arriveby, departure, destination, leaveat |
| train | arriveby, book people, day, departure, destination, leaveat |

FIG. 4

PRESERVING TEXT AND SPEECH SEMANTICS USING REAL-TIME VIRTUAL CORPORA IN LIVE INTERACTIVE CHATBOT SESSIONS

BACKGROUND

Aspects of the disclosure relate to hardware and/or software for preserving text and speech semantics using real-time virtual corpora in live interactive chatbot sessions. In particular, one or more aspects of the disclosure relate to performing natural language processing (NLP) on a user input, determining whether the input is the same as or similar to a previously received input stored in a global corpora, determining whether the input is the same as or similar to a previously received input, and, based on determining that the input is different from previously received inputs in the global corpora, storing the input in a virtual corpora and performing further analysis on the input.

Current distributed, interactive chatbot sessions allow a plurality of chatbots (e.g., a chatbot stack) to each interact with a plurality of users. A first chatbot may receive input (e.g., speech, text, or the like) from a first user and may pose questions to the first user to better understand the first user's input. The first chatbot may use the first user's responses to generate a response to the input. The first chatbot may store the first user's input and the first user's responses in temporary memory (e.g., slot memory) associated with the first chatbot and may use the contents of the slot memory during an interactive chatbot session with another user. A second chatbot may engage in a distributed, interactive chat session with a second user, wherein the second user may generate an input similar to the first user's input. The second chatbot may pose questions to the second user and may receive responses from the second user. The second chatbot may use the responses to better understand the second user's input and to respond to the second user's input. The second chatbot might not have access to the slot memory associated with the first chatbot and, as such, may repeat a similar investigative process as the first chatbot to understand the second user's input. In some instances, the chatbot stack might not have access to a central database (e.g., a global corpora) of learned information and, as such, may repeatedly engage with users to learn information that one chatbot may have already stored in its slot memory. Therefore, current distributed, interactive chatbot sessions neither offer chatbots the opportunity to dissect the input using text and speech semantics nor allow the chatbot stack to retrieve information from and add information to the global corpora.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with preserving text and speech semantics using real-time virtual corpora in live interactive chatbot sessions.

In accordance with one or more embodiments, a method may comprise, at a computing device including at least one processor and memory, receiving, by a chatbot and from a user, a data input. The method may comprise performing, by the chatbot, natural language processing on the data input. The method may comprise identifying, by the chatbot, a plurality of characteristics that correspond to the data input. The method may comprise, based on determining that additional data is needed to populate the plurality of characteristics and to generate a response to the data input, transmitting, by the chatbot, the data input to a slot memory. The method may comprise determining, by a controller, whether a second plurality of characteristics associated with a similar data input is stored in a virtual corpora. The method may comprise, based on determining that the second plurality of characteristics associated with the similar data input is stored in the virtual corpora, transmitting, by the controller, the second plurality of characteristics associated with the similar data input to the chatbot. The method may comprise increasing, by the controller, a count associated with the similar data input. The method may comprise, based on the count satisfying count threshold rules, transmitting, by the controller, the similar data input and the second plurality of characteristics associated with the similar data input to a global corpora.

In accordance with one or more embodiments, a computing platform may comprise at least one processor, a communication interface communicatively coupled to the at least one processor, and memory storing computer-readable instructions that, when executed by the at least one processor, cause the computing platform to receive, by a chatbot and from a user, a data input. The computing platform may perform, by the chatbot, natural language processing on the data input. The computing platform may identify, by the chatbot, a plurality of characteristics that correspond to the data input. The computing platform may, based on determining that additional data is needed to populate the plurality of characteristics and to generate a response to the data input, transmit, by the chatbot, the data input to a slot memory. The computing platform may determine, by a controller, whether a second plurality of characteristics associated with a similar data input is stored in a virtual corpora. The computing platform may, based on determining that the second plurality of characteristics associated with the similar data input is stored in the virtual corpora, transmit, by the controller, the second plurality of characteristics associated with the similar data input to the chatbot. The computing platform may increase, by the controller, a count associated with the similar data input. The computing platform may, based on the count satisfying count threshold rules, transmit, by the controller, the similar data input and the second plurality of characteristics associated with the similar data input to a global corpora.

In accordance with one or more embodiments, one or more non-transitory computer-readable media storing instructions that, when executed by a computing platform comprising at least one processor, memory, and a communication interface, cause the computing platform to receive, by a chatbot and from a user, a data input. The instructions, when executed, may cause the computing platform to perform, by the chatbot, natural language processing on the data input. The instructions, when executed, may cause the computing platform to identify, by the chatbot, a plurality of characteristics that correspond to the data input. The instructions, when executed, may cause the computing platform to, based on determining that additional data is needed to populate the plurality of characteristics and to generate a response to the data input, transmit, by the chatbot, the data input to a slot memory. The instructions, when executed, may cause the computing platform to determine, by a controller, whether a second plurality of characteristics associated with a similar data input is stored in a virtual corpora. The instructions, when executed, may cause the computing platform to, based on determining that the second plurality of characteristics associated with the similar data input is stored in the virtual corpora, transmit, by the controller, the second plurality of characteristics associated with the similar data input to the chatbot. The instructions, when executed, may cause the computing platform to increase, by the controller, a count associated with the similar data input. The instructions, when executed, may cause the computing platform to, based on the count satisfying count threshold rules, transmit, by the controller, the similar data input and the second plurality of characteristics associated with the similar data input to a global corpora.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 2A-2H depict an illustrative event sequence for preserving text and speech semantics using real-time virtual corpora in live interactive chatbot sessions, in accordance with one or more example embodiments.

FIG. 4 depicts an illustrative example of the global corpora that may be used for preserving text and speech semantics using real-time virtual corpora in live interactive chatbot sessions, in accordance with one or more example embodiments.

DETAILED DESCRIPTION

Figure 1A:
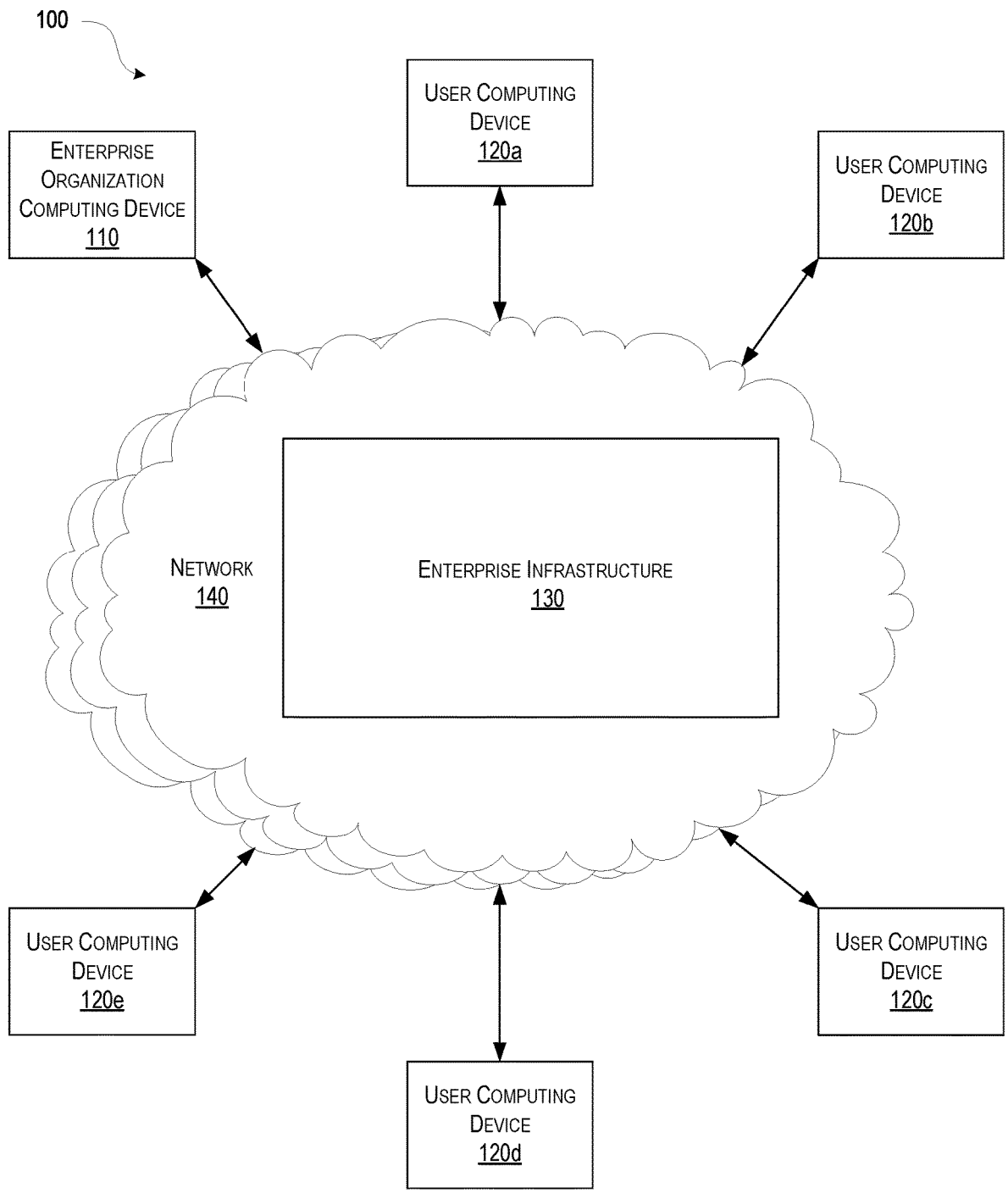
FIG. 1A depicts an illustrative example of a computing environment for preserving text and speech semantics using real-time virtual corpora in live interactive chatbot sessions, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current distributed, interactive chatbot sessions neither offer chatbots the opportunity to dissect user input using text and speech semantics nor allow a chatbot stack (e.g., a plurality of chatbots wherein each chatbot is associated with a global corpora) to access information that may be collected by a chatbot, but might not be added to the global corpora. Accordingly, proposed herein is a solution to the problem described above that includes preserving text and speech semantics using real-time virtual corpora in live interactive chatbot sessions. A user may transmit an input (e.g., a text input, a speech input, or the like) to a chatbot. The chatbot may parse the input and may determine whether a long short-term memory (e.g., a global corpora) contains information that the chatbot may use to generate a response to the input. If the chatbot determines that the global corpora contains information that may be used to generate the response, the chatbot may use the information within the global corpora to generate the response.

Alternatively, if the chatbot determines that the global corpora does not contain information that may be used to generate the response, the chatbot may transmit the input to a slot memory associated with the chatbot. A controller model may read the input from the slot memory and may determine whether a virtual corpora contains the same or a similar input that was previously received. If the controller model determines that the virtual corpora does not contain the same input or a similar input that was previously received, then the controller model may instruct the chatbot to generate queries and transmit the queries to the user to gather further information that the chatbot may use to generate a response to the input. Alternatively, if the controller model determines that the virtual corpora contains the same input or a similar input that was previously received, then the controller model may transmit, to the chatbot, the previously received input as well as any associated responses. The controller model may update the global corpora using information from the virtual corpora based on a count threshold and/or an ambiguity threshold.

In some examples, a computing environment may comprise the chatbot stack, the slot memory associated with each chatbot within the chatbot stack, the plurality of users, the controller model, the virtual corpora, and the global corpora. Each chatbot within the chatbot stack may comprise an identification module and a dialogue management module. A chatbot may receive an input (e.g., text or speech input) from a user. The identification module may parse the input using semantics and a natural language processing algorithm, and may determine whether a plurality of characteristics associated with the input (e.g., a domain associated with the input, a user intent associated with the input, a general concept that describes the input, or the like) may be identified. If the identification module determines that the plurality of characteristics can be identified, then the identification module may access the global corpora to populate the identified characteristics. The dialogue management module may further parse the input to determine whether further information is needed from the user to generate a response to the input. The dialogue management module may use the populated characteristics and/or the further information gathered from the user to generate a response to the input.

Alternatively, if the identification module determines that the plurality of characteristics can neither be identified nor populated, then the chatbot may transmit the input to the slot memory associated with the chatbot. The controller model may read the input from the slot memory associated with the chatbot and may determine whether information within the virtual corpora (e.g., a temporary storage that contains information that may be used to update the global corpora) may be used to identify and populate the plurality of characteristics that correspond to the input (e.g., the same or a similar input that was previously received). If the controller model determines that the virtual corpora does not contain the same input or a similar previously received input that may be used to identify and to populate the plurality of characteristics, then the controller model may instruct the chatbot to pose questions to the user, to use responses from the user to identify and populate the plurality of characteristics, and to use the populated characteristics to generate a response to the input.

Alternatively, if the controller model determines that the virtual corpora contains the same or a similar previously received input that may be used to identify and to populate the plurality of characteristics, then the controller model may transmit, to the chatbot, the same or similar previously received input as well as corresponding responses. The controller model may instruct the virtual corpora to increase a count associated with the information. The controller model may receive, from an enterprise organization computing device, a plurality of rules (e.g., count threshold rules, ambiguity threshold rules, or the like). The controller model may determine whether the count associated with previously received inputs within the virtual corpora satisfies the count threshold rules. If the controller model determines that the previously received inputs fail to satisfy the count threshold rules, then the controller model may instruct the virtual corpora to retain the previously received inputs. Alternatively, if the controller model determines that the previously received inputs satisfy the count threshold rules, then the controller model may determine whether the previously received inputs satisfy the ambiguity threshold rules. If the controller model determines that the previously received inputs fail to satisfy the ambiguity threshold rules, then the controller model may instruct the virtual corpora to retain the previously received inputs. If the controller model determines that the previously received inputs satisfy the ambiguity threshold rules, then the controller model may transmit the previously received inputs to the global corpora. The global corpora may receive the previously received inputs and may use the previously received inputs to update the information within the global corpora.

Computer Architecture

FIG. 1A depicts an illustrative example of a computing environment for preserving text and speech semantics using real-time virtual corpora in live interactive chatbot sessions, in accordance with the features described herein. Computing environment 100 may comprise enterprise organization computing device 110, user computing devices 120a-120e, enterprise infrastructure 130, and network 140. While FIG. 1A depicts more than one user computing device (e.g. user computing devices 120a-120e), each of user computing devices 120a-120e may be configured in accordance with the features described herein. While the description herein may refer to user computing device 120, it is important to note that the functions described in connection with user computing device 120 may also be performed by any one of user computing devices 120a-120e. Each one of user computing devices 120a-120e and enterprise organization computing device 110 may be configured to communicate with enterprise infrastructure 130 through network 140. In some arrangements, computing environment 100 may include additional computing devices that are not depicted in FIG. 1A, which may also be configured to interact with enterprise infrastructure 130 and, in some instances, user computing device 120.

Computing environment 100 may include one or more networks, which may interconnect one or more of user computing device 120, enterprise infrastructure 130, and enterprise organization computing device 110. For example, computing environment 100 may include network 140. Network 140 may include one or more sub-networks (e.g., local area networks (LANs), wide area networks (WANs), or the like). Furthermore, computing environment 100 may include a local network configured to interconnect each of the computing devices comprising enterprise infrastructure 130.

Figure 1C:
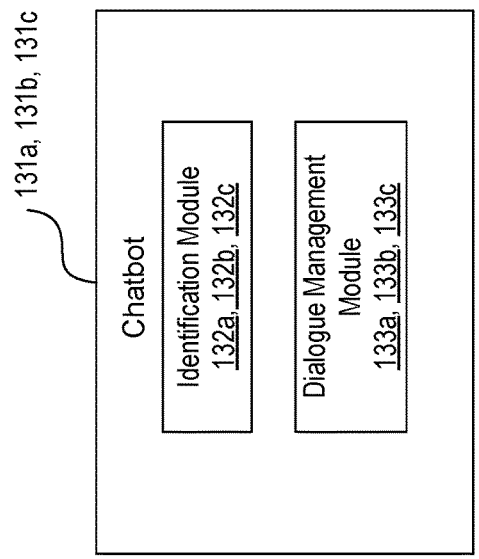
FIG. 1C depicts an illustrative example of the chatbot stack for preserving text and speech semantics using real-time virtual corpora in live interactive chatbot sessions, in accordance with one or more example embodiments.
Figure 1B:
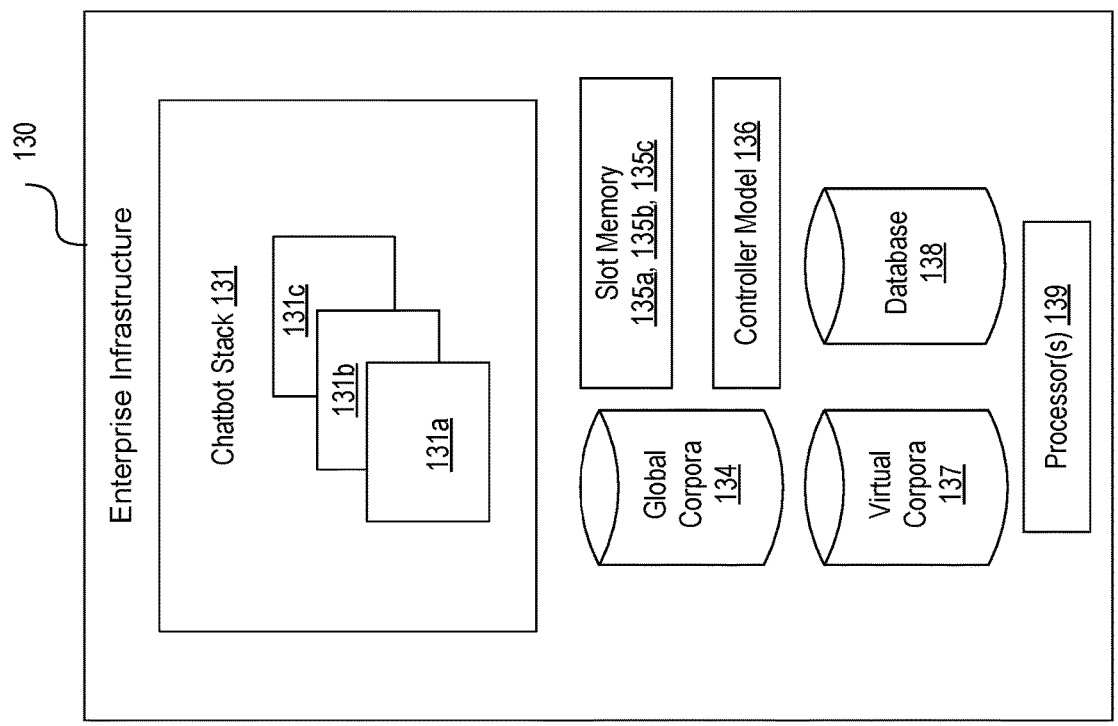
FIG. 1B depicts an illustrative example of the enterprise infrastructure for preserving text and speech semantics using real-time virtual corpora in live interactive chatbot sessions, in accordance with one or more example embodiments.

As discussed in detail in connection with FIG. 1B, enterprise organization infrastructure 130 may comprise chatbot stack 131, global corpora 134, controller model 136, virtual corpora 137, database 138, and processor(s) 139. While FIG. 1B may illustrate three chatbots within chatbot stack 131 (e.g., chatbots 131a, 131b, and 131c, referred to herein as "chatbot 131a" for illustration purposes), chatbot stack 131 may comprise more than three chatbots or less than three chatbots without departing from the disclosure. Chatbots 131a-131c are illustrated in FIG. 1B for illustration purposes and are not meant to be limiting. While the description herein may refer to chatbot 131a, it is important to note that the functions described in connection with chatbot 131a may also be performed by any one of chatbots 131a-131c. As discussed in detail in connection with FIG. 1C, each chatbot within chatbot stack 131 may comprise identification module 132 (e.g., identification module 132a may correspond to chatbot 131a) and dialogue management module 133 (e.g., dialogue management module 133a may correspond to chatbot 131a). While FIG. 1C references three chatbots (e.g., chatbots 131a-131c) and modules that correspond to each of the three chatbots (e.g., identification modules 132a-132c, and dialogue management modules 133a-133c), the number of modules may increase or decrease to correspond to (e.g., match) the number of chatbots within chatbot stack 131.

Enterprise infrastructure 130 may contain database 138 and processor(s) 139, which may be stored in the memory of the one or more computing device(s) of enterprise infrastructure 130. Enterprise infrastructure 130 may be associated with a distinct entity such as an enterprise organization, company, school, government, or the like, and may comprise one or more personal computer(s), server computer(s), handheld or laptop device(s), multiprocessor system(s), microprocessor-based system(s), set top box(es), programmable client electronic device(s), network personal computer(s) (PC), minicomputer(s), mainframe computer(s), distributed computing environment(s), or the like. Enterprise infrastructure 130 may include computing hardware and/or software that may host various data and applications for performing tasks of the centralized entity and interacting with user computing device 120, as well as other computing devices.

In some arrangements, enterprise infrastructure 130 may include and/or be part of enterprise information technology infrastructure and may host a plurality of enterprise applications, enterprise databases, and/or other enterprise resources. Such applications may be executed on one or more computing devices included in enterprise infrastructure 130 using distributed computing technology or the like. In some instances, enterprise infrastructure 130 may include a relatively large number of servers that may support operations of the enterprise organization, such as a financial institution.

As illustrated in FIG. 1A, computing environment 100 may comprise enterprise organization computing device 110. Enterprise organization computing device 110 may be associated with a distinct entity such as an enterprise organization, company, school, government, or the like. Enterprise organization computing device 110 may be configured to generate a plurality of rules (e.g., count threshold rules, ambiguity threshold rules, or the like). Enterprise organization computing device 110 may transmit the plurality of rules to controller model 136.

The count threshold rules may be used to determine whether to update global corpora 134 using data (e.g., a current input, previously received inputs) from virtual corpora 137. As discussed in detail in connection with FIG. 1B, global corpora 134 may comprise data that each chatbot within chatbot stack 131 may use to generate responses to the current inputs received from user computing devices 120a-120e. Virtual corpora 137 may comprise data that might not be stored in global corpora 134, but may be used by each chatbot within chatbot stack 131 to generate at least one response to the current inputs received from user computing devices 120a-120e. The data within both global corpora 134 and virtual corpora 137 may comprise characteristics that may describe the current input (or a previously received input). For example, global corpora 134 and virtual corpora 137 may identify a domain that may describe the current input (or a previously received input), a user intent that may correspond to the current input (or a previously received input), a general concept that may correspond to the current input (or a previously received input), properties that may be associated with the domain that may describe the current input (or a previously received input), or the like.

For example, user computing device 120 may transmit, to chatbot 131a, a request to make a restaurant reservation (e.g., "I would like to make a reservation at restaurant ABC in New York City for Y number of people on DD/MM/YY"). As discussed in greater detail below, chatbot 131a may determine that global corpora 134 might not contain data (e.g., a domain, a user intent, a general concept that may describe the current input, properties that may describe the domain, or the like) that may be used to generate a response to the current input. Chatbot 131a may transmit the current input to slot memory 135 and controller model 136 may determine whether virtual corpora 137 contains data that chatbot 131a may use to generate the response to the current input. Controller model 136 may use the count threshold rules and the ambiguity threshold rules to determine whether the data (e.g., a domain, a user intent, a general concept that may describe the current input, properties that may describe the domain, or the like) within virtual corpora 137 should be transmitted to and stored within global corpora 134.

The count threshold rules may indicate criteria for determining when the data is eligible to move from virtual corpora 137 to global corpora 134 (e.g., a minimum number of times the same input should be received before the input may be added to global corpora 134, a minimum number of times that inputs associated with the same domain should be received before the domain may be added to global corpora 134, a minimum number of times that a particular user intent should be detected before the corresponding input may be added to global corpora 134, a minimum number of times a general concept should be detected before the corresponding input may be added to global corpora 134, or the like). Each input within virtual corpora 137 may be associated with a count (e.g., a number of times the input was received by a chatbot within chatbot stack 131, a number of times a domain was used to generate a response to an input, or the like). The count associated with each input may change over time (e.g., the count may increase when another input is received and is the same as or is similar to (e.g., may meet a threshold value of matching characteristics, key words, or the like) a previously received input within virtual corpora 137). If an input (e.g., the current input, the previously received input stored in virtual corpora 137, or the like) fails to satisfy the count threshold rules, then the input may remain within virtual corpora 137. Alternatively, if the input (e.g., the current input, the previously received input stored in virtual corpora 137, or the like) satisfies the count threshold rules, then the ambiguity threshold rules may be used to determine whether the input should be transmitted to and stored within global corpora 134.

The ambiguity threshold rules may indicate criteria for determining the accuracy of the data within virtual corpora 137 before the data is transmitted to global corpora 134 (e.g., whether the domain that was used to generate the response to the current input (or the previously received input) accurately addressed the user's request, whether the user intent detected in the current input (or the previously received input) accurately address the user's request, whether the general concept detected in the current input (or the previously received input) accurately reflected the user's request, whether the correct domain was identified but the incorrect properties were used to describe the domain, or the like). If an input (e.g., the current input, the previously received input stored in virtual corpora 137, or the like) fails to satisfy the ambiguity threshold rules, then the input may remain within virtual corpora 137. Alternatively, if the input satisfies the ambiguity threshold rules, then the input and the responses associated with the input may be transmitted to and stored within global corpora 134.

As further illustrated in FIG. 1A, computing environment 100 may comprise user computing devices 120a-120e (referred to herein as "user computing device 120"). User computing device 120 may be configured to generate and to transmit an input (e.g., a textual input, a voice input, a computer-generated voice input, or the like) to chatbot 131a. User computing device 120 may use at least one peripheral device to generate the input (e.g., a keyboard, a mouse, a microphone, a device configured to receive input via speech recognition, or the like). The input may comprise at least one request for chatbot 131a to perform an action (e.g., a request for chatbot 131a to provide a service, a request for chatbot 131a to provide clarification on a point, a request for chatbot 131a to provide a recommendation, or the like). User computing device 120 may transmit the request to chatbot 131a.

In some instances, user computing device 120 may receive, from chatbot 131a, at least one query. The at least one query may comprise a request for information to further clarify the current input (e.g., a request for user computing device 120 to provide additional details that chatbot 131a may use to understand the domain, the user intent, and/or the general concept associated with the current input). User computing device 120 may generate at least one response to the at least one query and may transmit the at least one response to chatbot 131*a*.

User computing device 120 may receive, from chatbot 131*a*, at least one response to the current input. The at least one response to the current input may address the request in the current input (e.g., the at least one response may confirm the request to book a hotel room, the at least one response may provide the requested service, the at least one response may provide the requested clarification, or the like). Based on the at least one response received from chatbot 131*a*, user computing device 120 may determine whether to continue the conversation with chatbot 131*a*. If user computing device 120 determines that chatbot 131*a* provided the requested information, then user computing device 120 may terminate the conversation with chatbot 131*a* and might not transmit additional inputs to chatbot 131*a*. Alternatively, if user computing device 120 determines that additional information may be needed from chatbot 131*a*, then user computing device 120 may continue transmitting inputs to chatbot 131*a*, in accordance with the methods and features described herein.

FIG. 1B depicts an illustrative example of enterprise infrastructure 130 for preserving text and speech semantics using real-time virtual corpora in live interactive chatbot sessions, in accordance with the features described herein. Enterprise infrastructure 130 may comprise chatbot stack 131, global corpora 134, slot memories 135*a*-135*c*, controller model 136, virtual corpora 137, database 138, and processor(s) 139. Enterprise infrastructure 130 may be configured to operate as a computing platform on which the components and computing devices within enterprise infrastructure 130 may preserve text and speech semantics using real-time virtual corpora in live interactive chatbot sessions. In some instances, the computing platform may comprise chatbot stack 131, global corpora 134, slot memories 135*a*-135*c*, controller model 136, virtual corpora 137, database 138, and/or processor(s) 139.

Chatbot stack 131 may comprise a plurality of chatbots (e.g., chatbots 131*a*-131*c*, referred to herein as "chatbot 131*a*"). Each chatbot within chatbot stack 131 may be configured to engage in conversation with user computing device 120. In particular, each chatbot within chatbot stack 131 may be configured to receive input from user computing device 120, to parse the current input, to perform natural language processing (NLP) on the current input using at least one NLP algorithm (e.g., a supervised machine learning model that may be configured to perform text classification), and to perform natural language generation (NLG) to generate and to transmit, to user computing device 120, at least one response to the current input. As illustrated in FIG. 1C, each chatbot within chatbot stack 131 may comprise identification module 132 (e.g., identification modules 132*a*-132*c*, referred to herein as "identification module 132") and dialogue management module 133 (e.g., dialogue management modules 133*a*-133*c*, referred to herein as "dialogue management module 133").

Identification module 132 may use the at least one NLP algorithm to analyze the current input and to identify one or more key terms, characters, symbols, punctuation, semantics, or the like. For example, the at least one NLP algorithm may be configured to read and to detect interrogative words (e.g., who, what, where, why, when, how, or the like) and to read and to detect instructional verbs (e.g., do, find, trace, provide, clarify, or the like) to determine whether the current input may instruct chatbot 131*a* to provide a service, to provide further information, or the like. Identification module 132 may use the at least one NLP algorithm to determine whether characteristics that describe the current input may be identified (e.g., a domain that describes the current input, a user intent that corresponds to the current input, a general concept that corresponds to the current input, properties associated with the domain that may describe the current input, or the like). If identification module 132 determines that the at least one NLP algorithm may identify the characteristics that may describe the current input, then identification module 132 may access global corpora 134. Identification module 132 may use global corpora 134 to populate the identified characteristics. To do so, identification module 132 may locate, within global corpora 134, the identified domain that describes the current input. Each domain within global corpora 134 may be associated with a plurality of slot terms, wherein the plurality of slot terms may identify properties that may be associated with the domain that may describe the current input. Identification module 132 may use the identified general concept and the identified user intent to determine the properties that may be used to generate a response to the current input, as described in detail in connection with FIG. 4. Alternatively, if identification module 132 determines that the at least one NLP algorithm might not identify the characteristics that may describe the current input, then identification module 132 may transmit the current input to slot memory 135.

Based on determining that the at least one NLP algorithm may identify at least one characteristic that may describe the current input, dialogue management module 133 may use the at least one NLP algorithm to further analyze the current input. In particular, dialogue management module 133 may parse the current input and may use the at least one NLP algorithm to determine whether to pose queries to user computing device 120 to gather additional data that may be used to identify and to populate one or more characteristics that may describe the current input. For example, if identification module 132 identifies a general concept and a domain associated with the current input, then dialogue management module 133 may further parse the current input to determine whether the user intent may be identified. If dialogue management module 133 determines that further details may be needed from user computing device 120 to identify and to populate at least one characteristic (e.g., the user intent associated with the current input), then dialogue management module 133 may generate at least one query to request further details from user computing device 120. Dialogue management module 133 may transmit the at least one query to user computing device 120 and may receive, from user computing device 120, at least one response to the at least one query. Dialogue management module 133 may parse the at least one response and may determine whether to pose additional queries to user computing device 120. In some instances, dialogue management module 133 may continue to pose queries to user computing device 120 to gather information that may be used to identify and to populate the at least one characteristic.

Alternatively, if dialogue management module 133 determines that the characteristics that describe the current input may be populated and that additional details from user computing device 120 might not be needed, then dialogue management module 133 may perform natural language generation (NLG) using the populated characteristics to generate a response to the current input. To do so, dialogue management module 133 may use the populated characteristics to provide the service requested in the current input, to provide the clarification requested in the current input, to answer the question posed in the current input, or the like.

Dialogue management module 133 may transmit, to user computing device 120, the response to the current input.

In some instances, chatbot 131*a* may receive, from controller model 136, at least one previously received input that may be the same as or similar to the current input, characteristics that may describe the at least one previously received input, and at least one response that may be associated with the at least one previously received input. Chatbot 131*a* may compare the characteristics associated with the at least one previously received input to the characteristics associated with the current input. Chatbot 131*a* may use the at least one previously received input and the at least one associated response to generate the response to the current input.

As further illustrated in FIG. 1B, enterprise infrastructure 130 may comprise global corpora 134. Global corpora 134 may comprise data that each chatbot within chatbot stack 131 may use to generate responses to the current inputs. In particular, global corpora 134 may store a plurality of domains that may be used to describe the current input and to identify an industry that may be associated with the current request. FIG. 4 depicts sample data that may be stored within global corpora 134. As illustrated in FIG. 4, the plurality of domains stored in global corpora 134 may span an array of industries (e.g., hospitality, transportation, entertainment, or the like). Global corpora 134 may also store a plurality of slot terms (e.g., properties associated with each domain that may describe the current input through the lens of the corresponding domain). For example, as illustrated in FIG. 4, global corpora 134 may store a bus domain and slot terms (e.g., properties) that describe the bus domain, such as "ArriveBy," "Destination," "LeaveAt," or the like. In some instances, identification module 132 may use the identified general concept and the identified user intent to determine the slot terms (e.g., properties) that may be used to generate a response to the current input. In some instances, identification module 132 may use less than a total number of slot terms associated with a domain (e.g., identification module 132 may select the slot terms that may provide information relevant to the user intent and the general concept of the current input).

Global corpora 134 may receive, from controller model 136, data from virtual corpora 137 that may be stored in global corpora 134 based on the data satisfying the count threshold rules and the ambiguity threshold rules. Global corpora 134 may store the received data such that the received data may be used to analyze future inputs.

Access to global corpora 134 may differ depending on the computing device requesting access (e.g., a hierarchy of accessibility). Controller model 136 may be associated with a first level of accessibility (e.g., a least restrictive level of accessibility). Controller model 136 may perform functions on the data within global corpora 134 (e.g., access the data, add new data, remove data, modify the data, or the like). Chatbot stack 131 may be associated with a second level of accessibility (e.g., a more restrictive level of accessibility than the first level of accessibility). Chatbot stack 131 may view the data within global corpora 134, but might not be permitted to add, remove, or modify the data within global corpora 134.

Enterprise infrastructure 130 may further comprise slot memories 135*a*-135*c* (referred to herein as "slot memory 135"). Each chatbot within chatbot stack 131 may be associated with a corresponding slot memory 135 (e.g., slot memory 135*a* may correspond to chatbot 131*a*). Slot memory 135 may receive the current input from the corresponding chatbot (e.g., slot memory 135*a* may receive the current input from chatbot 131*a*, slot memory 135*b* may receive the current input from chatbot 131*b*, or the like). Slot memory 135 may be configured to operate as temporary memory that may store the current input based on identification module 132 determining that global corpora 134 might not contain data that may be used to identify the characteristics that describe the current input. Slot memory 135 may further be configured to operate as temporary memory that may store the current input based on dialogue management module 133 determining that further analysis of the current input may be needed. Slot memory 135 may retain the current input (e.g., until controller model 136 retrieves the current input from slot memory 135). In some instances, slot memory 135 may receive, from controller model 136, instructions to clear (e.g., erase, wipe, remove, or the like) the current input from slot memory 135. To do so, slot memory 135 may locate at least one cell within slot memory 135 that may store the current input and may clear the data stored on the at least one cell.

Enterprise infrastructure 130 may further comprise controller model 136. Controller model 136 may be configured to facilitate communication between chatbot 131*a*, global corpora 134, slot memory 135, and/or virtual corpora 137. Controller model 136 may retrieve the current input from slot memory 135. Controller model 136 may compare the current input to the previously received inputs that may be stored in virtual corpora 137. Controller model 136 may determine whether the current input is the same as or is similar to at least one of the previously received inputs. If controller model 136 determines that the current input may be the same as or similar to at least one of the previously received inputs, then controller model 136 may retrieve a copy of the at least one previously received input from virtual corpora 137. Controller model 136 may transmit the copy of the at least one previously received input that may be the same as or similar to the current input to chatbot 131*a*. Controller model 136 may instruct slot memory 135 to clear (e.g., erase, wipe, remove, or the like) the current input from slot memory 135. Controller model 136 may transmit, to virtual corpora 137, instructions to increase the count associated with the at least one previously received input.

Alternatively, if controller model 136 determines that the current input might not be the same as or similar to at least one previously received input, then controller model 136 may instruct chatbot 131*a* to generate queries that may be used to gather additional details from user computing device 120 to further understand the current input and to identify characteristics that may describe the current input. Controller model 136 may instruct chatbot 131*a* to transmit the queries to user computing device 120.

Controller model 136 may receive a plurality of rules from enterprise organization computing device 110 (e.g., count threshold rules, ambiguity threshold rules, or the like). Controller model 136 may use the rules to determine whether data from virtual corpora 137 should be transmitted to and stored within global corpora 134. Controller model 136 may determine whether data (e.g., the current input, a previously received input, or the like) stored in virtual corpora 137 satisfies the count threshold rules (e.g., whether a count associated with the current input (or the previously received input) is equal to or greater than a minimum number of times the same or similar inputs should be received before the input may be added to global corpora 134, whether a count associated with the current input (or the previously received input) is equal to or greater than a minimum number of times that inputs associated with the same domain should be received before the domain may be added to global corpora 134, or the like). If controller model 136 determines that the current input (or the previously received input) fails to satisfy the count threshold rules, then controller model 136 may instruct virtual corpora 137 to retain the current input (or the previously received input).

Alternatively, if controller model 136 determines that the current input (or the previously received input) satisfies the count threshold rules, then controller model 136 may determine whether the current input (or the previously received input) satisfies the ambiguity threshold rules. If controller model 136 determines that the current input (or the previously received input) fails to satisfy the ambiguity threshold rules, then controller model 136 may instruct virtual corpora 137 to retain the current input (or the previously received input). Alternatively, if controller model 136 determines that the current input (or the previously received input) satisfies the ambiguity threshold rules, then controller model 136 may retrieve, from virtual corpora 137, the current input (or the previously received input), characteristics that may describe the current input (or the previously received input), at least one response that corresponds to the current input (or the previously received input), and/or properties that may describe the domain. Controller model 136 may transmit the retrieved data to global corpora 134.

Enterprise infrastructure 130 may further comprise virtual corpora 137. Virtual corpora 137 may comprise data that might not be stored in global corpora 134, but may be used by each chatbot within chatbot stack 131 to generate at least one response to the current input. Virtual corpora 137 may store at least one previously received input, characteristics that may describe the at least one previously received input, slot terms, and/or at least one response that may have been used to respond to the at least one previously received input. Virtual corpora 137 may be configured to store the at least one previously received input, the characteristics that may describe the at least one previously received input, the slot terms, and/or the at least one response until controller model 136 determines whether the at least one previously received input, the characteristics, the slot terms, and/or the at least one response may be transmitted to and stored within global corpora 134.

In some instances, virtual corpora 137 may receive, from controller model 136, a request to access the at least one previously received input, the characteristics that may describe the at least one previously received input, the slot terms, and/or the at least one response associated with the at least one previously received input. Based on controller model 136 determining that the current input may be the same as or similar to the at least one previously received input, virtual corpora 137 may permit controller model 136 to retrieve a copy of the requested data. In such instances, virtual corpora 137 may receive, from controller model 136, instructions to increase the count associated with the at least one previously received input. To do so, virtual corpora 137 may identify the count associated with the at least one previously received input (e.g., a number of times the same input may have been received, a number of times a similar input may have been received, a number of times an input with the same or similar characteristics may have been received, or the like). Virtual corpora 137 may increase the count and may store the updated count with the at least one previously received input.

In some instances, and based on controller model 136 determining that the at least one previously received input fails to satisfy the count threshold rules, virtual corpora 137 may receive, from controller model 136, instructions to retain the at least one previously received inputs. Virtual corpora 137 may continue to store the at least one previously received input, the characteristics that may describe the at least one previously received input, the slot terms, and/or the at least one response that corresponds to the at least one previously received input (e.g., until controller model 136 determines the at least one previously received input satisfies the count threshold rules). In some instances, and based on controller model 136 determining that the at least one previously received input satisfies the count threshold rules but fails to satisfy the ambiguity threshold rules, virtual corpora 137 may receive, from controller model 136, instructions to retain the at least one previously received input. Virtual corpora 137 may continue to store the at least one previously received input, the characteristics that may describe the at least one previously received input, the slot terms, and/or the at least one response that corresponds to the at least one previously received input (e.g., until controller model 136 determines the at least one previously received input satisfies the count threshold rules and the ambiguity threshold rules).

Preserving Text and Speech Semantics Using Real-Time Virtual Corpora in Live Interactive Chatbot Sessions FIGS. 2A-2H depict an illustrative event sequence for preserving text and speech semantics using real-time virtual corpora in live interactive chatbot sessions, in accordance with one or more aspects described herein. While aspects described with respect to FIG. 2A to FIG. 4 include the evaluation of a single input, a plurality of inputs may be received and evaluated (e.g., in parallel) without departing from the present disclosure. Further, the method described herein may be performed in real-time or near real-time.

Figure 2A:
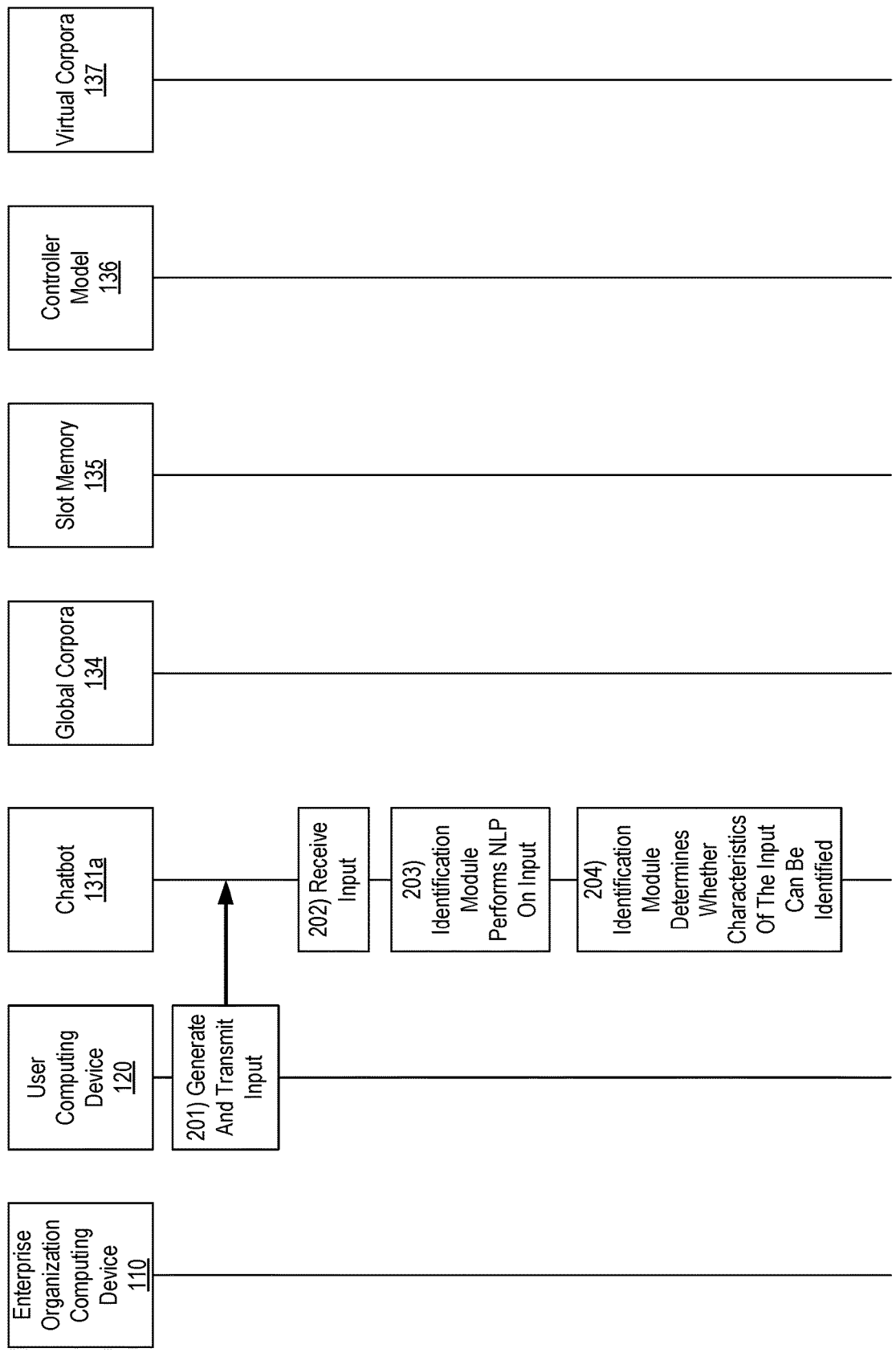

Referring to FIG. 2A, at step 201, user computing device 120 may be configured to generate and to transmit an input (e.g., a textual input, a voice input, a computer-generated voice input, or the like) to chatbot 131a. User computing device 120 may use at least one peripheral device to generate the input (e.g., a keyboard, a mouse, a microphone, a device configured to receive input via speech recognition, or the like). The input may comprise at least one request for chatbot 131a to perform an action (e.g., a request for chatbot 131a to provide a service, a request for chatbot 131a to provide clarification on a point, a request for chatbot 131a to provide a recommendation, or the like). User computing device 120 may transmit the request to chatbot 131a.

At step 202, chatbot 131a may receive the current input from user computing device 120. At step 203, identification module 132 may parse the current input using at least one NLP algorithm. Identification module 132 may use the at least one NLP algorithm to analyze the current input and to identify one or more key terms, characters, symbols, punctuation, or the like. For example, the at least one NLP algorithm may be configured to read and to detect interrogative words (e.g., who, what, where, why, when, how, or the like) and to read and to detect instructional verbs (e.g., do, find, trace, provide, clarify, or the like) to determine whether the current input may instruct chatbot 131a to provide a service, to provide further information, or the like. In some instances, the at least one NLP algorithm may be configured to read and detect punctuation marks to determine an objective associated with the current input (e.g., a current input that is punctuated with a question mark may indicate a question, a current input that is punctuated with a period may indicate a command, or the like).

At step 204, identification module 132 may use the at least one NLP algorithm to determine whether characteristics that describe the current input may be identified. For example, identification module 132 may determine whether the at least one NLP algorithm is able to identify a domain that may describe the current input, a user intent that may correspond to the current input, a general concept that may correspond to the current input, and/or slot terms (e.g., properties associated with the domain that may describe the current input), or the like).

Figure 2B:
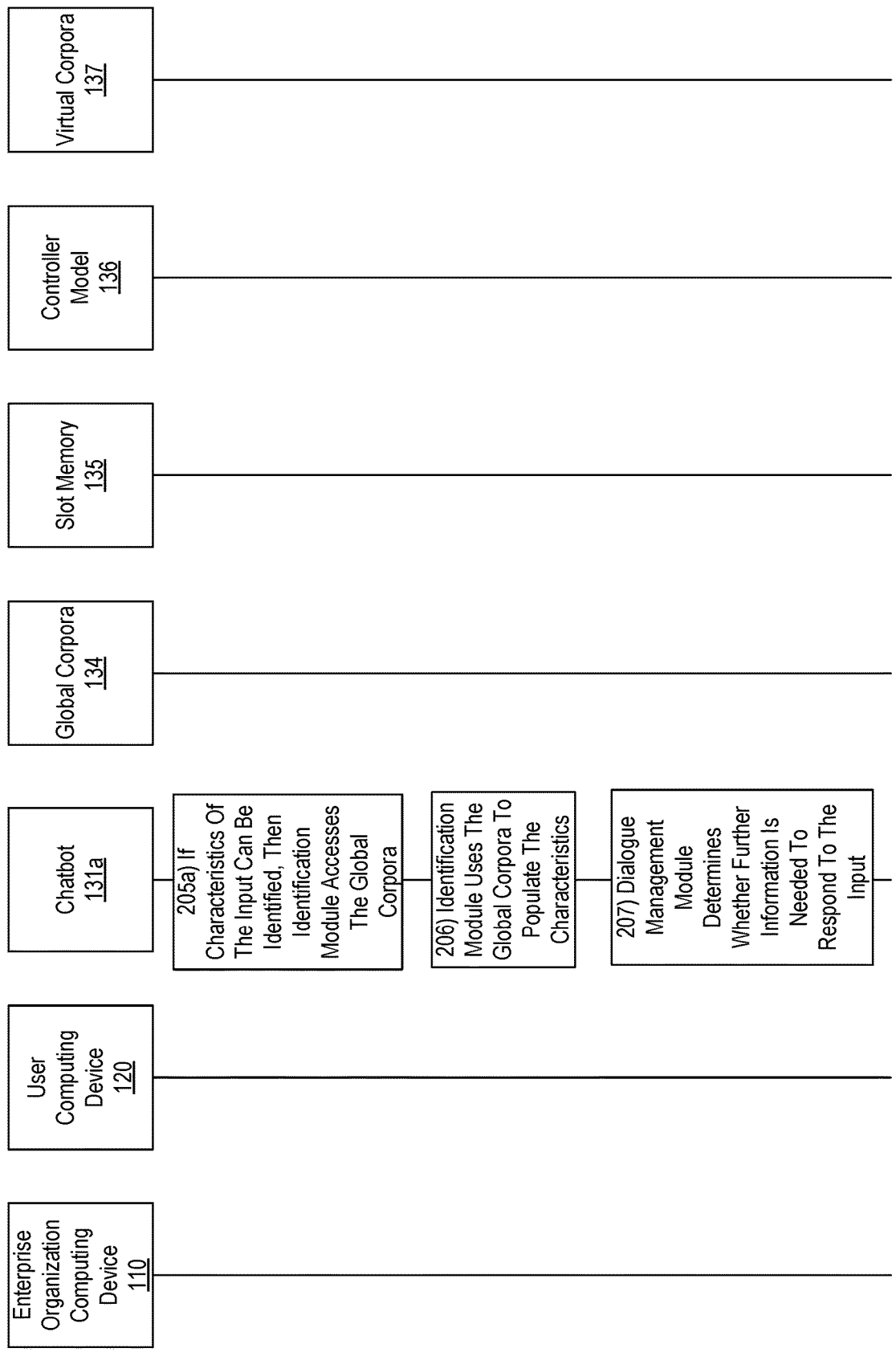
Figure 2C:
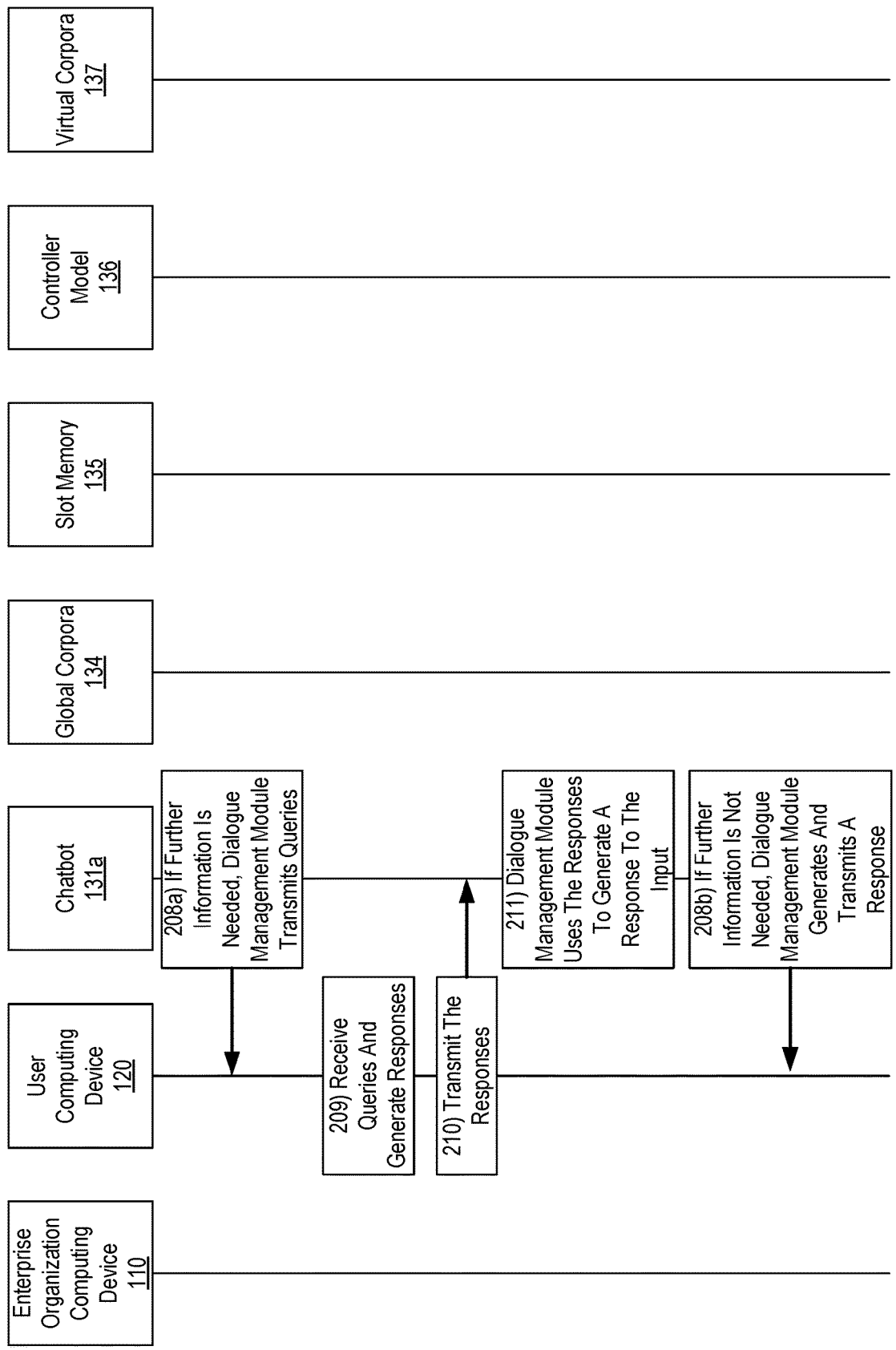

If, at step 204, identification module 132 determines that the at least one NLP algorithm is able to identify the characteristics that may describe the current input, then, referring to FIG. 2B and at step 205*a*, identification module 132 may request access to global corpora 134. At step 206, identification module 132 may use global corpora 134 to populate the identified characteristics. To do so, identification module 132 may locate, within global corpora 134, the identified domain that describes the current input. Each domain within global corpora 134 may be associated with a plurality of slot terms. Identification module 132 may use the identified general concept and the identified user intent to determine the slot terms that may be used to generate a response to the current input.

For example, the current input may ask chatbot 131*a* to purchase a ticket for an upcoming trip (e.g., "I would like to book a bus ticket to travel from City A to City B on DD/MM/YY"). Based on the parsing by the at least one NLP algorithm, identification module 132 may determine that the general concept that may be associated with the current domain may be locating transportation. Identification module 132 may determine, based on the at least one NLP algorithm, that the user intent that may correspond to the current input may be purchasing a bus ticket. Identification module 132 may determine, based on the at least one NLP algorithm, that the domain that may correspond to the current input may be a bus domain. As such, identification module 132 may access global corpora 134 to determine whether global corpora 134 contains data that may be used to generate at least one response to the current input. As illustrated in FIG. 4, identification module 132 may determine that global corpora 134 contains the bus domain as well as slot terms that correspond to the bus domain. Identification module 132 may use the general concept, the user intent, and/or the current input to populate the slot terms. For example, identification module 132 may determine that the current input identifies a departure city and an arrival city, and may populate the "Departure" slot term and the "Destination" slot term.

At step 207, dialogue management module 133 may determine whether further information may be needed from user computing device 120 to identify the characteristics that may describe the current input and to populate the characteristics. Dialogue management module 133 may parse the current input and may use the at least one NLP algorithm to determine whether to pose queries to user computing device 120 to gather additional data that may be used to identify and to populate one or more characteristics that may describe the current input. For example, if identification module 132 identifies a general concept and a domain associated with the current input, then dialogue management module 133 may further parse the current input to determine whether the user intent may be identified. If, at step 207, dialogue management module 133 determines that further details may be required to identify and populate the characteristics, then, referring to FIG. 2C and at step 208*a*, dialogue management module 133 may generate at least one query to request further details from user computing device 120. Dialogue management module 133 may transmit the at least one query to user computing device 120.

At step 209, user computing device 120 may receive, from dialogue management module 133, the at least one query. The at least one query may comprise a request for information to further clarify the current input (e.g., "Would you prefer a bus ticket with an early morning departure time or a late afternoon departure time?"). User computing device 120 may generate at least one response to the at least one query. At step 210, user computing device 120 may transmit the at least one response to chatbot 131*a*.

At step 211, chatbot 131*a* may receive the at least one response and dialogue management module 133 may parse the at least one response. Dialogue management module 133 may use the information gathered from the at least one response to generate a response to the current input. For example, the at least one response may indicate that an early morning bus departure time is preferred. As such, dialogue management module 133 may generate a response indicating that a bus ticket with an early morning departure time may have been purchased. In some instances, and based on the at least one response from user computing device 120, dialogue management module 133 may continue to pose queries to user computing device 120 to gather additional information that may be used to identify and to populate the characteristics.

However, if, at step 207, dialogue management module 133 determines that further details might not be required to identify and populate the characteristics, then, at step 208*b*, dialogue management module 133 may perform natural language generation (NLG) using the populated characteristics to generate a response to the current input. Dialogue management module 133 may use the populated characteristics to provide the service requested in the current input (e.g., to direct user computing device 120 to a bus ticket booking webpage), to provide the clarification requested in the current input (e.g., to instruct user computing device 120 to select a preferred departure time prior to booking the bus ticket), to answer the question posed in the current input, or the like. Dialogue management module 133 may transmit, to user computing device 120, the response to the current input.

Figure 2D:
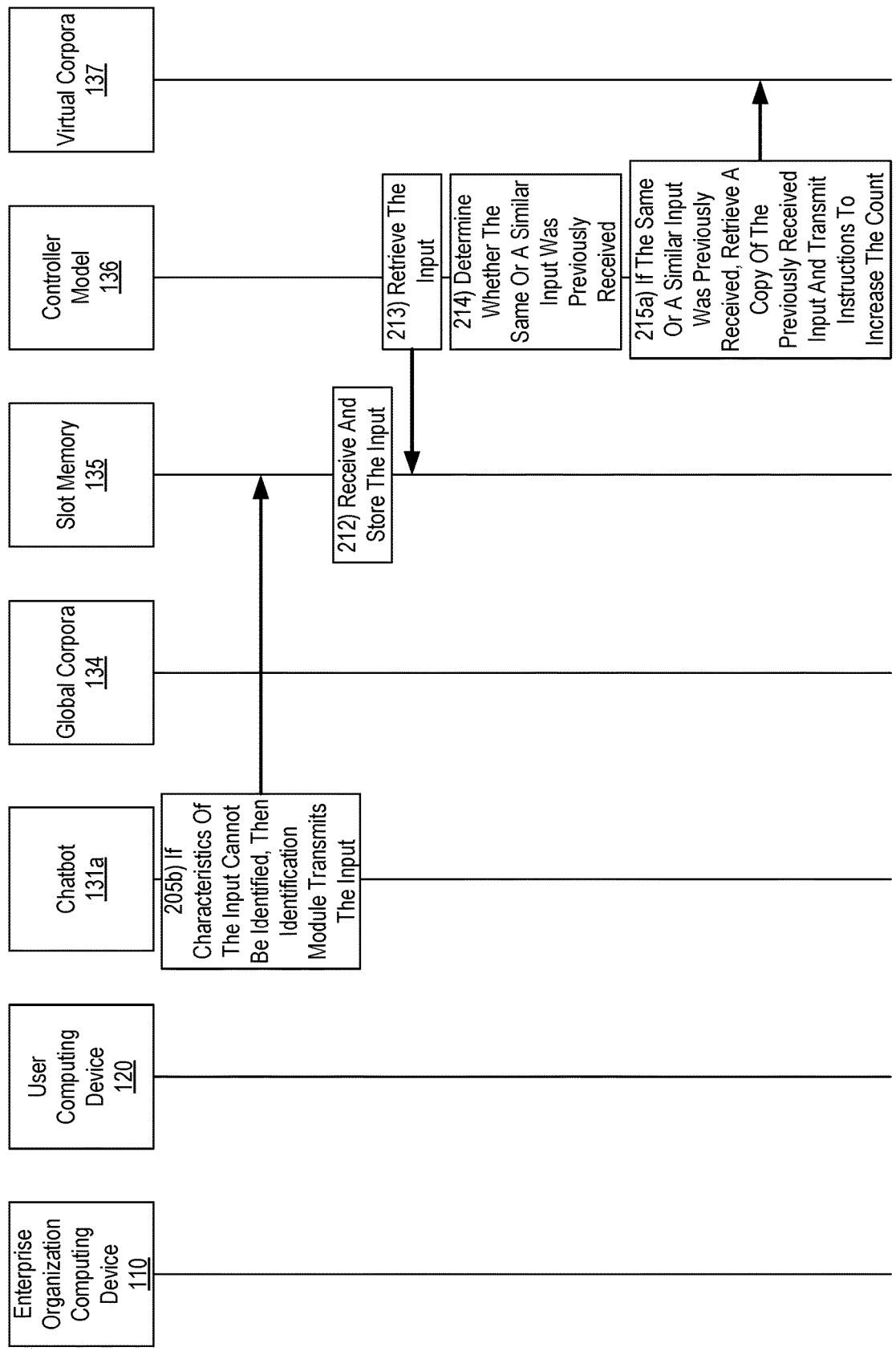

Alternatively, if, at step 204, identification module 132 determines that the at least one NLP algorithm might not be able to identify the characteristics that may describe the current input, then, referring to FIG. 2D and at step 205*b*, identification module may transmit the current input to slot memory 135. At step 212, slot memory 135 may receive and store the current input.

At step 213, controller model 136 may request access to slot memory 135. In particular, controller model 136 may request access to the current input that may be stored in slot memory 135. Controller model 136 may retrieve the current input from slot memory 135.

At step 214, controller model 136 may determine whether the current input may be the same as or similar to at least one of the previously received inputs. To do so, controller model 136 may compare the current input, retrieved from slot memory 135, to the previously received inputs that may be stored in virtual corpora 137. If, at step 214, controller model 136 determines that the current input may be the same as or similar to at least one of the previously received inputs, then, at step 215*a*, controller model 136 may retrieve a copy of the at least one previously received input from virtual corpora 137. Controller model 136 may transmit, to virtual corpora 137, instructions to increase the count associated with the at least one previously received input.

Figure 2E:
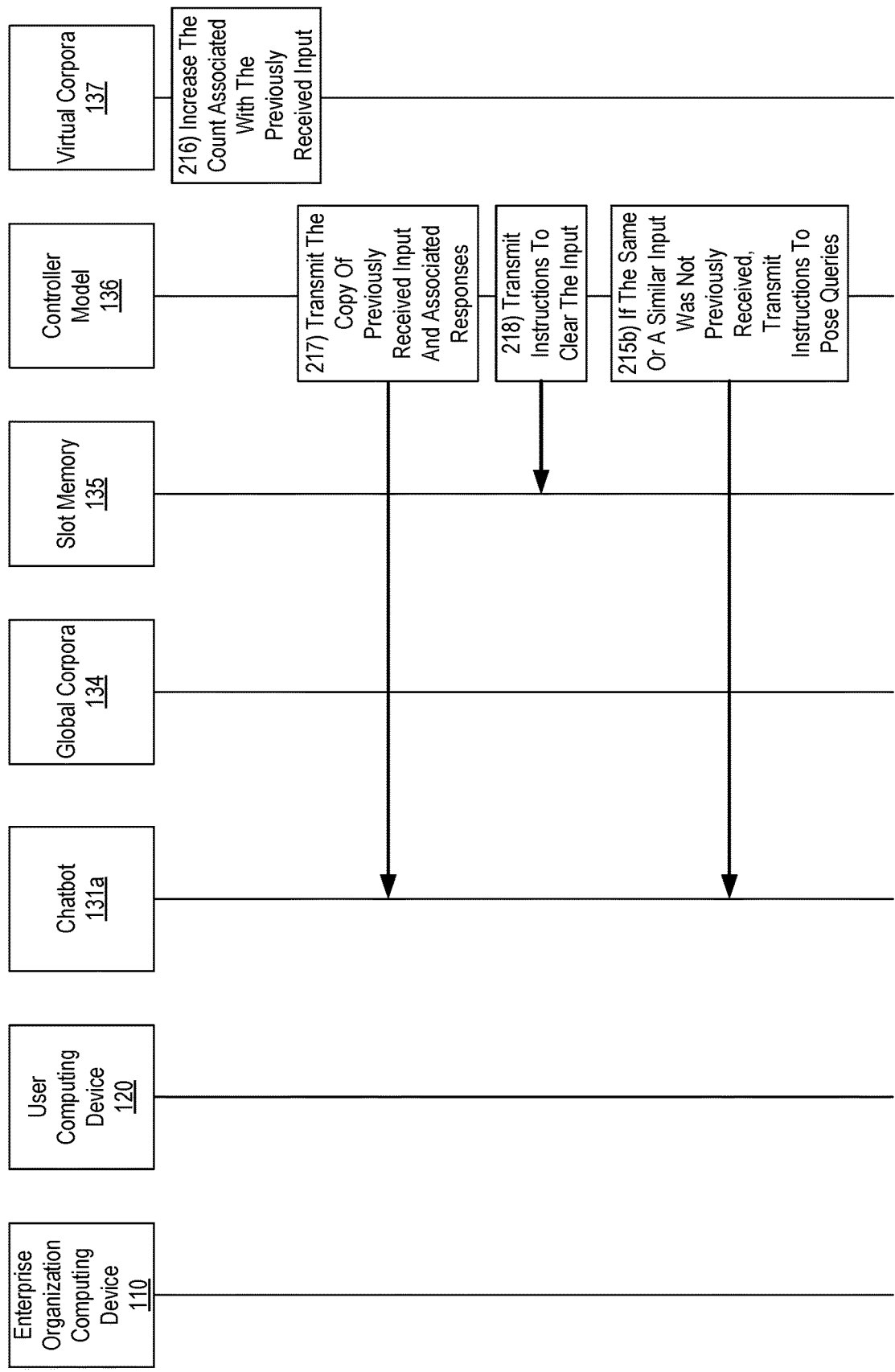

Referring to FIG. 2E, at step 216, virtual corpora 137 may increase the count associated with the at least one previously received input that may have been retrieved by controller model 136. To do so, virtual corpora 137 may identify the count associated with the at least one previously received input (e.g., a number of times the same input may have been received, a number of times a similar input may have been received, a number of times an input with the same or similar characteristics may have been received, or the like). Virtual corpora 137 may increase the count (e.g., by one) and may store the updated count with the at least one previously received input in virtual corpora 137.

At step 217, controller model 136 may transmit, to chatbot 131a, the copy of the at least one previously received input that may be the same as or similar to the current input. As described above, chatbot 131a may use the at least one previously received input and the at least one associated response to generate the response to the current input.

At step 218, controller model 136 may transmit instructions to slot memory 135 to clear (e.g., erase, wipe, remove, or the like) the current input from slot memory 135. To do so, slot memory 135 may locate at least one cell within slot memory 135 that may store the current input and may clear the data stored on the at least one cell.

Alternatively, if, at step 214, controller model 136 determines that the current input might not be the same as or similar to at least one of the previously received inputs, then, at step 215b, controller model 136 may instruct chatbot 131a to generate queries that may be used to gather additional details from user computing device 120 to further understand the current input and to identify characteristics that may describe the current input. Controller model 136 may further instruct chatbot 131a to transmit the queries to user computing device 120.

Referring to FIG. 2F, at step 219, chatbot 131 may generate at least one query to request additional details from user computing device 120. In particular, dialogue management module 133 may generate at least one query to request details that dialogue management module 133 may use to better understand the domain, the user intent, the general concept, and/or the slot terms associated with the current input. Dialogue management module 133 may transmit the at least one query to user computing device 120. At step 220, user computing device 120 may receive the at least one query and may generate at least one response to the at least one query. At step 221, user computing device 120 may transmit the at least one response to chatbot 131a.

At step 222, chatbot 131a may use the at least one response from user computing device 120 to determine whether characteristics that may describe the current input may be identified (e.g., a domain, a user intent, a general concept, and/or slot terms associated with the current input). In particular, dialogue management module 133 may parse the at least one response from user computing device 120. Dialogue management module 133 may use the at least one NLP algorithm to identify and extract information from the at least one response, and may use the extracted information to determine whether the characteristics may be identified and populated.

If, at step 222, dialogue management module 133 determines that the at least one response may be used to identify and populate the characteristics, then, at step 223a, identification module 132 may identify and populate the characteristics. Dialogue management module 133 may use the identified and populated characteristics to generate the response to the current input. To do so, dialogue management module 133 may perform natural language generation (NLG) using the populated characteristics. Dialogue management module 133 may use the populated characteristics to provide the service requested in the current input (e.g., to direct user computing device 120 to a bus ticket booking webpage), to provide the clarification requested in the current input (e.g., to instruct user computing device 120 to select a preferred departure time prior to booking the bus ticket), to answer the question posed in the current input, or the like. Dialogue management module 133 may transmit, to user computing device 120, the response to the current input.

Figure 2G:
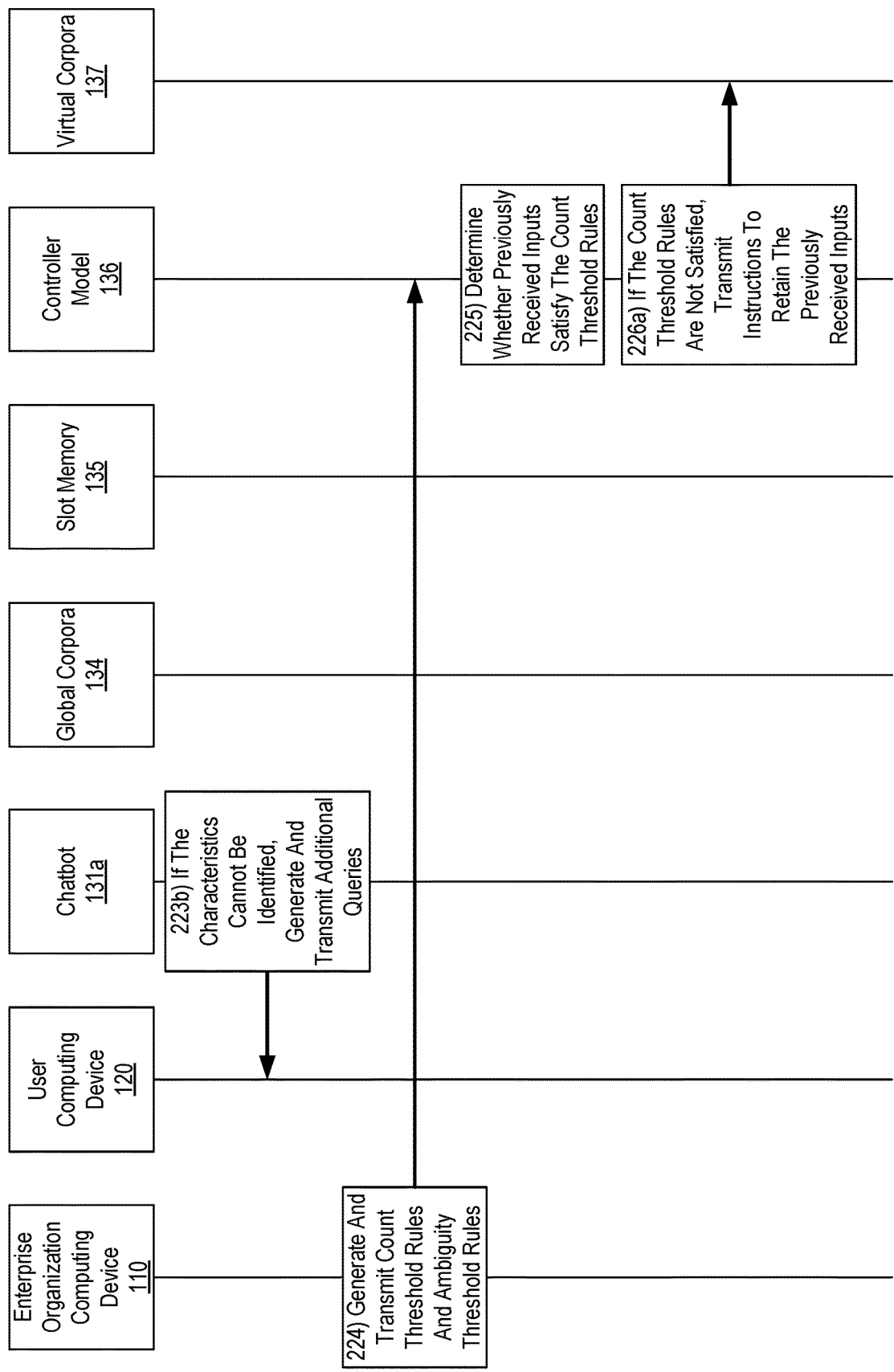
Figure 2H:
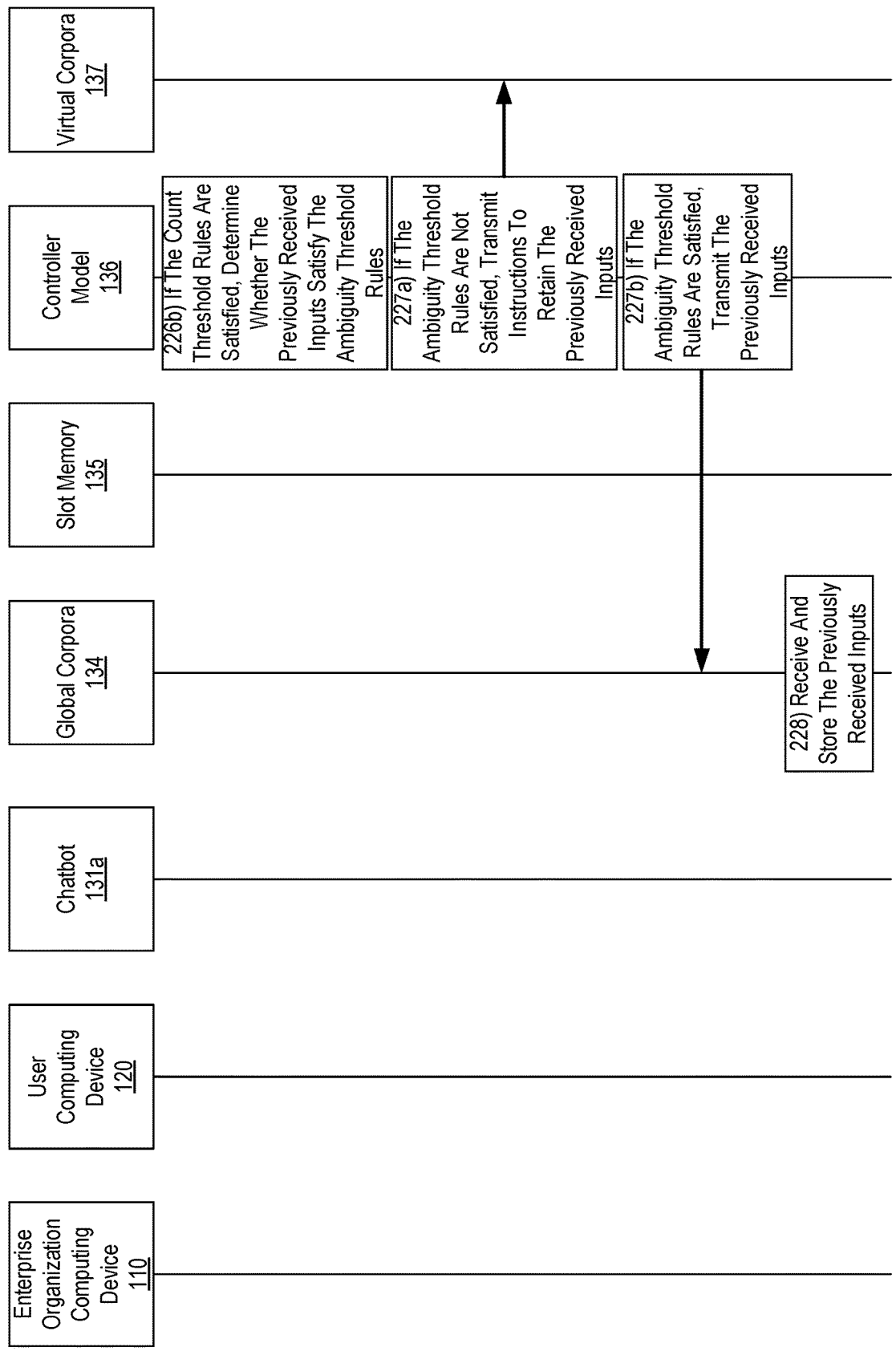

However, if, at step 222, dialogue management module 133 determines that the at least one response might not be used to identify and populate the characteristics, then, referring to FIG. 2G and at step 223b, dialogue management module 133 may generate and transmit, to user computing device 120, at least one query to request additional details. Dialogue management module 133 may receive, from user computing device 120, at least one response to the at least one query, and may parse the at least one response using the at least one NLP algorithm. Dialogue management module 133 may continue to generate and to transmit queries to user computing device 120 (e.g., until dialogue management module 133 determines that the at least one response from user computing device 120 provides the details needed to identify and to populate the characteristics, until user computing device 120 requests intervention from an individual associated with the enterprise organization, or the like).

At step 224, enterprise organization computing device 110 may generate a plurality of rules (e.g., count threshold rules, ambiguity threshold rules, or the like). As described above, the count threshold rules and/or the ambiguity threshold rules may be used to determine whether to update global corpora 134 using data (e.g., a current input, previously received inputs) from virtual corpora 137. The count threshold rules may indicate criteria for determining when the data is eligible to move from virtual corpora 137 to global corpora 134 (e.g., a minimum number of times the same input should be received before the input may be added to global corpora 134, a minimum number of times that inputs associated with the same domain should be received before the domain may be added to global corpora 134, a minimum number of times that a particular user intent should be detected before the corresponding input may be added to global corpora 134, a minimum number of times a general concept should be detected before the corresponding input may be added to global corpora 134, or the like). Each input within virtual corpora 137 may be associated with a count (e.g., a number of times the input was received by a chatbot within chatbot stack 131, a number of times a domain was used to generate a response to an input, or the like).

The ambiguity threshold rules may indicate criteria for determining the accuracy of the data within virtual corpora 137 before the data may be transmitted to global corpora 134 (e.g., whether the domain that was used to generate the response to the current input (or the previously received input) accurately addressed the user's request, whether the user intent detected in the current input (or the previously received input) accurately addressed the user's request, whether the general concept detected in the current input (or the previously received input) accurately reflected the user's request, whether the correct domain was identified but the incorrect slot terms were used to describe the domain, or the like). The accuracy of the data within virtual corpora 137 may be based on whether user computing device 120, after receiving the response to the current input, transmits additional inputs (e.g., requests) to address issues (e.g., miscommunications, mistakes, or the like) in the response to the current input. In some instances, user computing device 120 may determine that the response to the current input might not address the request (e.g., might not address the user's question, might not address the user's request, may provide information that me associated with a general concept that may be different from the general concept associated with the current input, or the like) indicated in the current input. As such, user computing device 120 may transmit at least one additional input to request additional assistance and/or services from chatbot 131*a*. In such instances, the accuracy of the response (and the associated characteristics) may be lowered. On the other hand, user computing device 120 may determine that the response to the current input accurately addressed the request (e.g., accurately answered the user's question, accurately provided the requested service, or the like). As such, the accuracy of the response (and the associated characteristics) may be increased.

Enterprise organization computing device 110 may transmit the count threshold rules and the ambiguity threshold rules to controller model 136. At step 225, controller model 136 may receive the count threshold rules and the ambiguity threshold rules from enterprise organization computing device 110. Controller model 136 may use the rules to determine whether data from virtual corpora 137 should be transmitted to and stored within global corpora 134. Controller model 136 may determine whether data (e.g., the current input, a previously received input, or the like) stored in virtual corpora 137 satisfies the count threshold rules (e.g., whether a count associated with the current input (or the previously received input) is equal to or greater than a minimum number of times the same or similar inputs should be received before the input may be added to global corpora 134, whether a count associated with the current input (or the previously received input) is equal to or greater than a minimum number of times that inputs associated with the same domain should be received before the domain may be added to global corpora 134, or the like).

If, at step 225, controller model 136 determines that the current input (or the previously received input) fails to satisfy the count threshold rules, then, at step 226*a*, controller model 136 may instruct virtual corpora 137 to retain the current input (or the previously received input). As such, controller model 136 might not transmit the current input (or the previously received input) to global corpora 134. Alternatively, if, at step 225, controller model 136 determines that the current input (or the previously received input) satisfies the count threshold rules, then, referring to FIG. 2H and at step 226*b*, controller model 136 may determine whether the current input (or the previously received input) satisfies the ambiguity threshold rules (e.g., whether an accuracy count associated with the current input (or the previously received input) is equal to or greater than a threshold accuracy count that may be established by the enterprise organization, whether the accuracy count associated with the current input (or the previously received input) is less than a maximum ambiguity count that may be established by the enterprise organization, or the like).

If, at step 226*b*, controller model 136 determines that the current input (or the previously received input) fails to satisfy the ambiguity threshold rules, then, at step 227*a*, controller model 136 may instruct virtual corpora 137 to retain the current input (or the previously received input). As such, controller model 136 might not transmit the current input (or the previously received input) to global corpora 134. Alternatively, if, at step 226*b*, controller model 136 determines that the current input (or the previously received input) satisfies the ambiguity threshold rules, then, at step 227*b*, controller model 136 may retrieve, from virtual corpora 137, the current input (or the previously received input), characteristics that may describe the current input (or the previously received input), at least one response that may correspond to the current input (or the previously received input), and/or slot terms that may be associated with the domain. Controller model 136 may transmit the retrieved data to global corpora 134.

At step 228, global corpora 134 may receive, from controller model 136, the current input (or the previously received input), characteristics that may describe the current input (or the previously received input), at least one response that may correspond to the current input (or the previously received input), and/or slot terms that may be associated with the domain. Global corpora 134 may store the current input (or the previously received input), the characteristics that may describe the current input (or the previously received input), the at least one response that may correspond to the current input (or the previously received input), and/or the slot terms that may be associated with the domain.

Figure 3A:
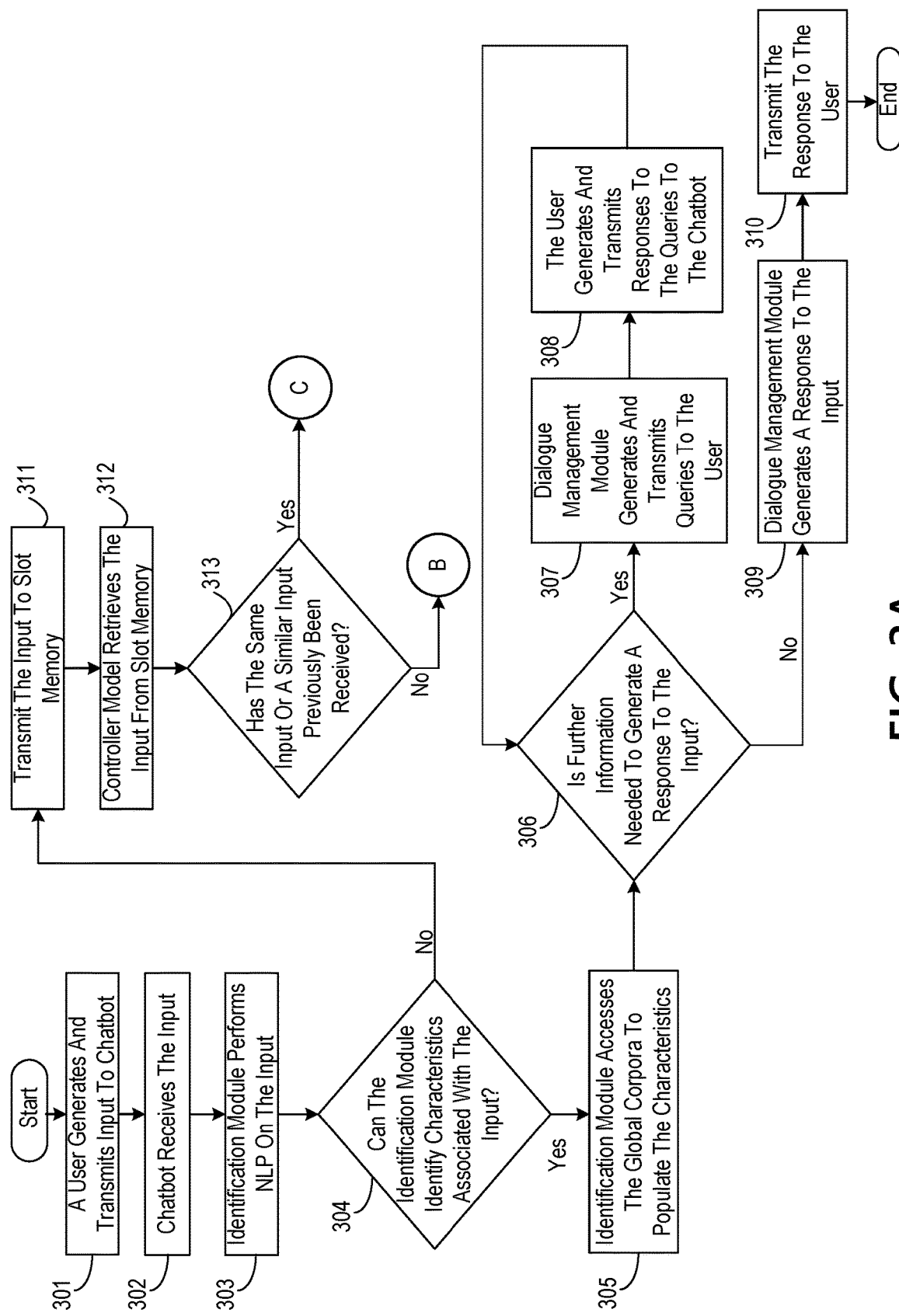
FIGS. 3A-3C depict an illustrative method for preserving text and speech semantics using real-time virtual corpora in live interactive chatbot sessions, in accordance with one or more example embodiments.
Figure 3B:
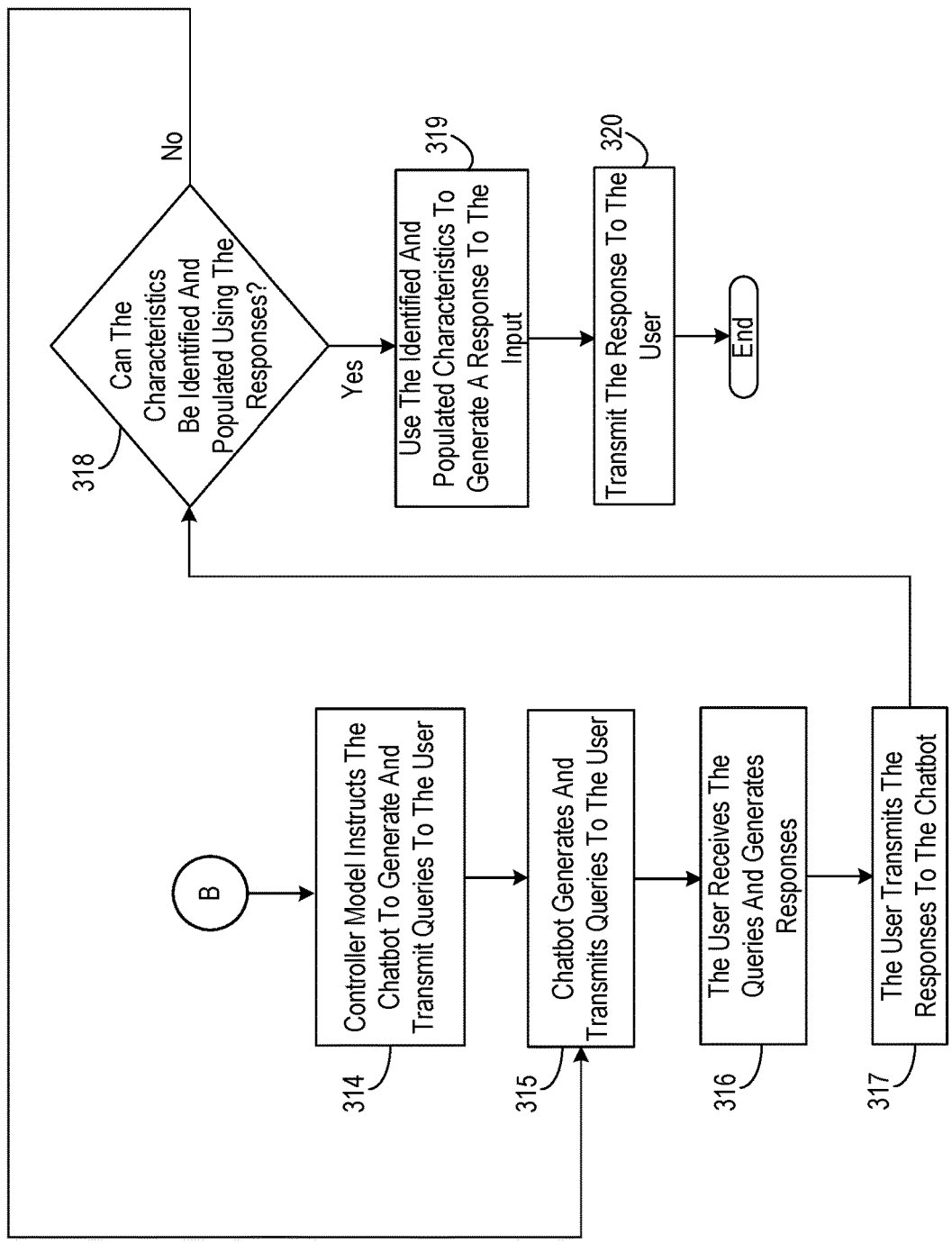
Figure 3C:
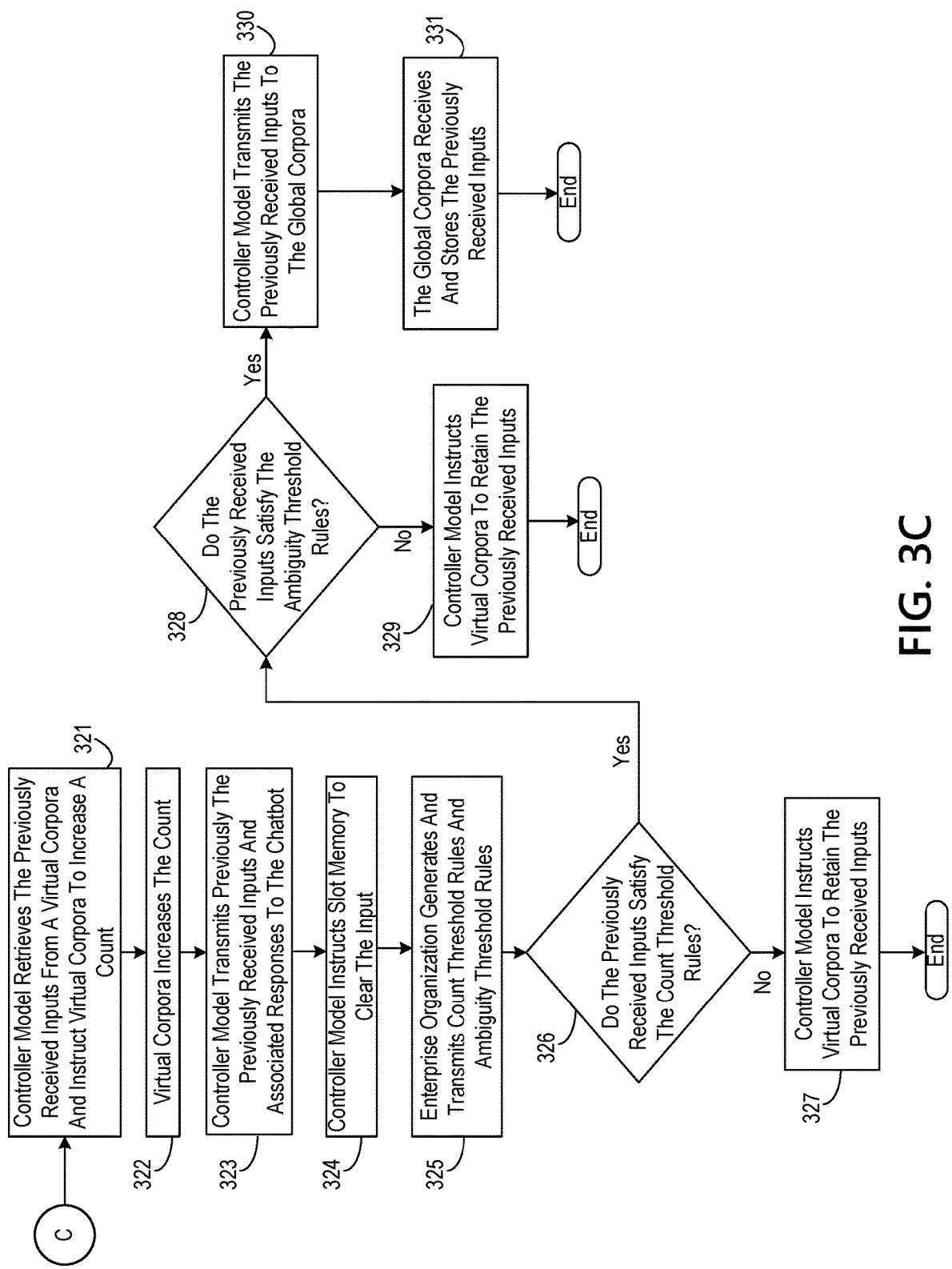

FIGS. 3A-3C depict flow diagrams illustrating one example method for preserving text and speech semantics using real-time virtual corpora in live interactive chatbot sessions, in accordance with one or more aspects described herein. The processes illustrated in FIGS. 3A-3C are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIGS. 3A-3C may be performed in real-time or near real-time.

At step 301, user computing device 120 may be configured to generate and to transmit an input (e.g., a textual input, a voice input, a computer-generated voice input, or the like) to chatbot 131*a*. At step 302, chatbot 131*a* may receive the current input from user computing device 120. At step 303, identification module 132 may parse the current input using at least one NLP algorithm. Identification module 132 may use the at least one NLP algorithm to analyze the current input and to identify one or more key terms, characters, symbols, punctuation, or the like.

At step 304, identification module 132 may use the at least one NLP algorithm to determine whether characteristics that describe the current input may be identified (e.g., a domain that may describe the current input, a user intent that may correspond to the current input, a general concept that may correspond to the current input, and/or slot terms that may describe the domain, or the like). If, at step 304, identification module 132 determines that the at least one NLP algorithm is able to identify the characteristics that may describe the current input, then, at step 305, identification module 132 may request access global corpora 134. Identification module 132 may use global corpora 134 to populate the identified characteristics.

At step 306, dialogue management module 133 may determine whether further information may be needed from user computing device 120 to identify the characteristics that may describe the current input and to populate the characteristics. Dialogue management module 133 may parse the current input and may use the at least one NLP algorithm to determine whether to pose queries to user computing device 120 to gather additional data that may be used to identify and to populate one or more characteristics that may describe the current input. If, at step 306, dialogue management module 133 determines that further details may be required to identify and populate the characteristics, then, at step 307, dialogue management module 133 may generate at least one query to request further details from user computing device 120. Dialogue management module 133 may transmit the at least one query to user computing device 120.

At step 308, user computing device 120 may receive, from dialogue management module 133, the at least one query. User computing device 120 may generate at least one response to the at least one query and may transmit the at least one response to chatbot 131a. The method flow described herein may return to step 306 in that dialogue management module 133 may parse the at least one response and may determine whether additional detail may be needed from user computing device 120. Dialogue management module 133 may continue to pose at least one query to user computing device 120 and to use the at least one response from user computing device 120 to generate a response to the current input.

However, if, at step 306, dialogue management module 133 determines that further details might not be required to identify and populate the characteristics, then, at step 309, dialogue management module 133 may perform natural language generation (NLG) using the populated characteristics to generate a response to the current input. At step 310, dialogue management module 133 may transmit, to user computing device 120, the response to the current input.

Alternatively, if, at step 304, identification module 132 determines that the at least one NLP algorithm might not be able to identify the characteristics that may describe the current input, then, at step 311, identification module may transmit the current input to slot memory 135.

At step 312, controller model 136 may retrieve the current input from slot memory 135. At step 313, controller model 136 may determine whether the current input may be the same as or similar to at least one of the previously received inputs. To do so, controller model 136 may compare the current input, retrieved from slot memory 135, to the previously received inputs that may be stored in virtual corpora 137. If, at step 313, controller model 136 determines that the current input might not be the same as or similar to at least one of the previously received inputs, then, referring to FIG. 3B and at step 314, controller model 136 may instruct chatbot 131a to generate queries that may be used to gather additional details from user computing device 120 to further understand the current input and to identify characteristics that may describe the current input. Controller model 136 may further instruct chatbot 131a to transmit the queries to user computing device 120.

At step 315, chatbot 131 may generate at least one query to request additional details from user computing device 120. In particular, dialogue management module 133 may generate at least one query to request details that dialogue management module 133 may use to better understand the domain, the user intent, the general concept, and/or the slot terms associated with the current input. Dialogue management module 133 may transmit the at least one query to user computing device 120.

At step 316, user computing device 120 may receive the at least one query and may generate at least one response to the at least one query. At step 317, user computing device 120 may transmit the at least one response to chatbot 131a.

At step 318, chatbot 131a may use the at least one response from user computing device 120 to determine whether the characteristics that may describe the current input may be identified. In particular, dialogue management module 133 may parse the at least one response from user computing device 120. Dialogue management module 133 may use the at least one NLP algorithm to identify and extract information from the at least one response, and may use the extracted information to determine whether the characteristics may be identified and populated.

If, at step 318, dialogue management module 133 determines that the at least one response might not be used to identify and populate the characteristics, then, the method flow described herein may return to step 315 in that dialogue management module 133 may generate at least one additional query to request additional details from user computing device 120. Dialogue management module 133 may continue to pose at least one query to user computing device 120 and to use the at least one response from user computing device 120 to determine whether the at least one response may be used to identify and populate the characteristics.

Alternatively, if, at step 318, dialogue management module 133 determines that the at least one response may be used to identify and populate the characteristics, then, at step 319, identification module 132 may identify and populate the characteristics. Dialogue management module 133 may use the identified and populated characteristics to generate the response to the current input. At step 320, dialogue management module 133 may transmit, to user computing device 120, the response to the current input.

However, returning to FIG. 3A, if, at step 313, controller model 136 determines that the current input may be the same as or similar to at least one of the previously received inputs, then, referring to FIG. 3C and at step 321, controller model 136 may retrieve a copy of the at least one previously received input from virtual corpora 137. Controller model 136 may also transmit, to virtual corpora 137, instructions to increase the count associated with the at least one previously received input. At step 322, virtual corpora 137 may increase the count associated with the at least one previously received input that may have been retrieved by controller model 136.

At step 323, controller model 136 may transmit, to chatbot 131a, the copy of the at least one previously received input that may be the same as or similar to the current input. As described above, chatbot 131a may use the at least one previously received input and the at least one associated response to generate the response to the current input.

At step 324, controller model 136 may transmit instructions to slot memory 135 to clear (e.g., erase, wipe, remove, or the like) the current input from slot memory 135. At step 325, enterprise organization computing device 110 may generate the count threshold rules and/or the ambiguity threshold rules. The count threshold rules and/or the ambiguity threshold rules may be used to determine whether to update global corpora 134 using data (e.g., the current input, previously received inputs) from virtual corpora 137, as described above.

At step 326, controller model 136 may determine whether data (e.g., the current input, a previously received input, or the like) stored in virtual corpora 137 satisfies the count threshold rules (e.g., whether a count associated with the current input (or the previously received input) is equal to or greater than a minimum number of times the same or similar inputs should be received before the input may be added to global corpora 134, whether a count associated with the current input (or the previously received input) is equal to or greater than a minimum number of times that inputs associated with the same domain should be received before the domain may be added to global corpora 134, or the like). If, at step 326, controller model 136 determines that the current input (or the previously received input) fails to satisfy the count threshold rules, then, at step 327, controller model 136 may instruct virtual corpora 137 to retain the current input (or the previously received input). As such, controller model 136 might not transmit the current input (or the previously received input) to global corpora 134.

Alternatively, if, at step 326, controller model 136 determines that the current input (or the previously received input) satisfies the count threshold rules, then, at step 328, controller model 136 may determine whether the current input (or the previously received input) satisfies the ambiguity threshold rules (e.g., whether an accuracy count associated with the current input (or the previously received input) is equal to or greater than a threshold accuracy count that may be established by the enterprise organization, whether the accuracy count associated with the current input (or the previously received input) is less than a maximum ambiguity count that may be established by the enterprise organization, or the like). If, at step 328, controller model 136 determines that the current input (or the previously received input) fails to satisfy the ambiguity threshold rules, then, at step 329, controller model 136 may instruct virtual corpora 137 to retain the current input (or the previously received input). As such, controller model 136 might not transmit the current input (or the previously received input) to global corpora 134.

Alternatively, if, at step 328, controller model 136 determines that the current input (or the previously received input) satisfies the ambiguity threshold rules, then, at step 330, controller model 136 may retrieve, from virtual corpora 137, the current input (or the previously received input), characteristics that may describe the current input (or the previously received input), at least one response that may correspond to the current input (or the previously received input), and/or slot terms that may be associated with the domain. Controller model 136 may transmit the retrieved data to global corpora 134.

At step 331, global corpora 134 may receive, from controller model 136, the current input (or the previously received input), the characteristics that may describe the current input (or the previously received input), the at least one response that may correspond to the current input (or the previously received input), and/or the slot terms that may be associated with the domain. Global corpora 134 may store the current input (or the previously received input), the characteristics that may describe the current input (or the previously received input), the at least one response that may correspond to the current input (or the previously received input), and/or the slot terms that may be associated with the domain.

As a result, the proposed solution may provide at least the following benefits: 1) real-time, or near real-time, access to the global corpora by a chatbot stack; 2) real-time, or near real-time, transmission of new words, grammar, and semantics to the virtual corpora; and 3) real-time, or near real-time, transmission of new words, grammar, and semantics to the global corpora using a count threshold and an ambiguity threshold.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing device including at least one processor and memory:
   receiving, by the at least one processor and from a user computing device, a data input;
   performing, by the at least one processor, natural language processing on the data input;

identifying, by the at least one processor and based on the natural language processing, a first plurality of characteristics that correspond to the data input;
based on determining that additional data is needed to populate the first plurality of characteristics and to generate a response to the data input, transmitting, by the at least one processor, the data input to a slot memory;
determining, by the at least one processor, whether a second plurality of characteristics associated with a same data input is stored in a virtual corpora, wherein the virtual corpora stores data available for use by a plurality of chatbots in a chatbot stack to generate a response to an input;
based on determining that the second plurality of characteristics associated with the same data input is stored in the virtual corpora:
transmitting, by the at least one processor, the second plurality of characteristics associated with the same data input to the user computing device;
transmitting, by the at least one processor, an instruction to the slot memory to clear the data input from the slot memory, wherein transmitting the instruction to the slot memory to clear the data input from the slot memory causes the slot memory to remove the data input from the slot memory;
increasing, by the at least one processor, a count associated with the same data input; and
based on the count satisfying count threshold rules, transmitting, by the at least one processor, the same data input and the second plurality of characteristics associated with the same data input to a global corpora.

2. The method of claim 1, wherein the natural language processing on the data input comprises:
parsing the data input, wherein the data input may comprise of at least one of:
a text input; or
a speech input; and
identifying semantics within the data input.

3. The method of claim 1, wherein the first plurality of characteristics that correspond to the data input comprises of at least one of:
a domain that describes the data input;
a user intent that corresponds to the data input;
a general concept that corresponds to the data input; or
slot terms that describe the domain.

4. The method of claim 1, further comprising:
populating, by the at least one processor, the first plurality of characteristics based on information stored in the global corpora; and
generating, by the at least one processor, the response to the data input using the populated first plurality of characteristics and natural language generation.

5. The method of claim 1, further comprising:
based on determining, by the at least one processor, the second plurality of characteristics associated with the same data input is not stored in the virtual corpora, generating, by the at least one processor, a plurality of questions that correspond to the first plurality of characteristics;
transmitting, by the at least one processor and to the user computing device, the plurality of questions; and
populating, by the at least one processor, the first plurality of characteristics based on responses to the plurality of questions.

6. The method of claim 1, further comprising transmitting, by the at least one processor, the same data input and the second plurality of characteristics associated with the same data input to the global corpora based on the same data input and the second plurality of characteristics associated with the same data input satisfying ambiguity threshold rules,
wherein the ambiguity threshold rules determine whether the same data input and the second plurality of characteristics associated with the same data input are associated with more than one concept.

7. A computing platform comprising:
at least one processor;
a communication interface communicatively coupled to the at least one processor; and
memory storing computer-readable instructions that, when executed by the at least one processor, cause the computing platform to:
receive, from a user computing device, a data input;
perform natural language processing on the data input;
identify, based on the natural language processing, a first plurality of characteristics that correspond to the data input;
based on determining that additional data is needed to populate the first plurality of characteristics and to generate a response to the data input, transmit the data input to a slot memory;
determine whether a second plurality of characteristics associated with a same data input is stored in a virtual corpora, wherein the virtual corpora stores data available for use by a plurality of chatbots in a chatbot stack to generate a response to an input;
based on determining that the second plurality of characteristics associated with the same data input is stored in the virtual corpora:
transmit the second plurality of characteristics associated with the same data input to the user computing device;
transmit an instruction to the slot memory to clear the data input from the slot memory, wherein transmitting the instruction to the slot memory to clear the data input from the slot memory causes the slot memory to remove the data input from the slot memory;
increase a count associated with the same data input; and
based on the count satisfying count threshold rules, transmit the same data input and the second plurality of characteristics associated with the same data input to a global corpora.

8. The computing platform of claim 7, wherein the natural language processing on the data input comprises:
parsing the data input, wherein the data input may comprise of at least one of:
a text input; or
a speech input; and
identifying semantics within the data input.

9. The computing platform of claim 7, wherein the first plurality of characteristics that correspond to the data input comprises of at least one of:
a domain that describes the data input;
a user intent that corresponds to the data input;
a general concept that corresponds to the data input; or
slot terms that describe the domain.

10. The computing platform of claim 7, wherein the instructions, when executed, further cause the computing platform to:

populate the first plurality of characteristics based on information stored in the global corpora; and generate the response to the data input using the populated first plurality of characteristics and natural language generation.

11. The computing platform of claim 7, wherein the instructions, when executed, further cause the computing platform to:

based on determining the second plurality of characteristics associated with the same data input is not stored in the virtual corpora, generate a plurality of questions that correspond to the first plurality of characteristics;

transmit, to the user computing device, the first plurality of questions; and populate the first plurality of characteristics based on responses to the plurality of questions.

12. The computing platform of claim 7, wherein the instructions, when executed, further cause the computing platform to transmit the same data input and the second plurality of characteristics associated with the same data input to the global corpora based on the same data input and the second plurality of characteristics associated with the same data input satisfying ambiguity threshold rules, wherein the ambiguity threshold rules determine whether the same data input and the second plurality of characteristics associated with the same data input are associated with more than one concept.

13. One or more non-transitory computer-readable media storing instructions that, when executed by a computing platform comprising at least one processor, memory, and a communication interface, cause the computing platform to:

receive, from a user computing device, a data input;

perform natural language processing on the data input;

identify, based on the natural language processing, a first plurality of characteristics that correspond to the data input;

based on determining that additional data is needed to populate the first plurality of characteristics and to generate a response to the data input, transmit the data input to a slot memory;

determine whether a second plurality of characteristics associated with a same data input is stored in a virtual corpora, wherein the virtual corpora stores data available for use by a plurality of chatbots in a chatbot stack to generate a response to an input;

based on determining that the second plurality of characteristics associated with the same data input is stored in the virtual corpora:

transmit the second plurality of characteristics associated with the same data input to the user computing device;

transmitting, by the at least one processor, an instruction to the slot memory to clear the data input from the slot memory, wherein transmitting the instruction to the slot memory to clear the data input from the slot memory causes the slot memory to remove the data input from the slot memory;

increase a count associated with the same data input; and based on the count satisfying count threshold rules, transmit the same data input and the second plurality of characteristics associated with the same data input to a global corpora.

14. The one or more non-transitory computer-readable media of claim 13, wherein the natural language processing on the data input comprises:

parsing the data input, wherein the data input may comprise of at least one of:

a text input; or a speech input; and identifying semantics within the data input.

15. The one or more non-transitory computer-readable media of claim 13, wherein the first plurality of characteristics that correspond to the data input comprises of at least one of:

a domain that describes the data input;

a user intent that corresponds to the data input;

a general concept that corresponds to the data input; or slot terms that describe the domain.

16. The one or more non-transitory computer-readable media of claim 13, wherein the instructions, when executed, further cause the computing platform to:

populate the first plurality of characteristics based on information stored in the global corpora; and generate the response to the data input using the populated first plurality of characteristics and natural language generation.

17. The one or more non-transitory computer-readable media of claim 13, wherein the instructions, when executed, further cause the computing platform to:

based on determining the second plurality of characteristics associated with the same data input is not stored in the virtual corpora, generate a plurality of questions that correspond to the first plurality of characteristics;

transmit, to the user computing device, the plurality of questions; and populate the first plurality of characteristics based on responses to the plurality of questions.

18. The one or more non-transitory computer-readable media of claim 13, wherein the instructions, when executed, further cause the computing platform to transmit the same data input and the second plurality of characteristics associated with the same data input to the global corpora based on the same data input and the second plurality of characteristics associated with the same data input satisfying ambiguity threshold rules, wherein the ambiguity threshold rules determine whether the same data input and the second plurality of characteristics associated with the same data input are associated with more than one concept.

* * * * *